(12) United States Patent
Baker

(10) Patent No.: US 10,011,982 B1
(45) Date of Patent: Jul. 3, 2018

(54) SCHOOL SPACES RETROFITTED FOR ALTERNATIVE USES AND RELATED TECHNOLOGY

(71) Applicant: Theodore W. Baker, Portland, OR (US)

(72) Inventor: Theodore W. Baker, Portland, OR (US)

( * ) Notice: Subject to any disclaimer, the term of this patent is extended or adjusted under 35 U.S.C. 154(b) by 0 days.

(21) Appl. No.: 15/263,527

(22) Filed: Sep. 13, 2016

Related U.S. Application Data

(60) Provisional application No. 62/222,750, filed on Sep. 23, 2015.

(51) Int. Cl.
| | | |
|---|---|---|
| *E04H 1/00* | (2006.01) | |
| *E04H 3/00* | (2006.01) | |
| *E04H 5/00* | (2006.01) | |
| *E04H 6/00* | (2006.01) | |
| *E04H 9/00* | (2006.01) | |
| *E04H 14/00* | (2006.01) | |
| *E04B 1/348* | (2006.01) | |
| *G06Q 30/06* | (2012.01) | |
| *G06Q 50/16* | (2012.01) | |
| *E04H 1/02* | (2006.01) | |
| *E04H 1/06* | (2006.01) | |

(52) U.S. Cl.
CPC ...... *E04B 1/34869* (2013.01); *E04B 1/34861* (2013.01); *E04H 1/02* (2013.01); *E04H 1/06* (2013.01); *G06Q 30/0645* (2013.01); *G06Q 50/16* (2013.01)

(58) Field of Classification Search
CPC ... E04B 1/34861; E04B 1/34869; E04H 1/02; E04H 1/06; E04H 1/005; G06Q 30/0645; G06Q 50/16

USPC .......................................................... 52/79.1
See application file for complete search history.

(56) References Cited

U.S. PATENT DOCUMENTS

| 2,638,635 A | 5/1953 | Priebe |
| 3,603,047 A | 9/1971 | Tournier |

(Continued)

OTHER PUBLICATIONS

Lauren Walser, Fall Asleep in Class at Portland. Oregon's Kennedy School, Jul. 29, 2015, https://savingplaces.org/stories/fall-asleep-in-class-at-portland-oregons-kennedy-school#.WZnQHJOGNZ0 (visited Aug. 21, 2017).

(Continued)

*Primary Examiner* — Brian D Mattei

(57) ABSTRACT

A collection of rentable units and associated structures in accordance with a particular embodiment of the present technology includes a first rentable unit encompassing at least a portion of a first retrofitted classroom within a retrofitted school building and a second rentable unit encompassing at least a portion of a second retrofitted classroom within the retrofitted school building. The first rentable unit includes a first reusable bathroom removably disposed in operable association with the first retrofitted classroom. Similarly, the second rentable unit includes a second reusable bathroom removably disposed in operable association with the second retrofitted classroom. The collection further comprises above-floor plumbing drain lines through which the reusable bathrooms are operably connected to a below-floor plumbing drain trunk line of the retrofitted school building.

20 Claims, 25 Drawing Sheets

(56) References Cited

U.S. PATENT DOCUMENTS

| | | | |
|---|---|---|---|
| 4,268,925 A | 5/1981 | Marple | |
| 4,745,719 A | 5/1988 | Blankstein et al. | |
| 5,265,384 A | 11/1993 | Menke et al. | |
| 5,761,857 A | 6/1998 | Kaufman et al. | |
| 5,931,642 A | 8/1999 | Friedman et al. | |
| 6,016,636 A | 1/2000 | Caputo | |
| 6,155,012 A | 12/2000 | Halbitte | |
| 6,179,358 B1 | 1/2001 | Hirayarna et al. | |
| 6,330,771 B1 * | 12/2001 | Hester, Jr. | E04H 3/08 52/106 |
| 7,779,585 B2 | 8/2010 | Hester, Jr. | |
| 8,474,203 B1 | 7/2013 | Stewart et al. | |
| 8,919,049 B2 * | 12/2014 | Meserini | E03C 1/01 52/143 |
| 9,097,030 B1 | 8/2015 | Manterfield | |
| 2003/0140571 A1 * | 7/2003 | Muha | A47K 4/00 52/79.1 |
| 2003/0140572 A1 | 7/2003 | Hertzog et al. | |
| 2004/0206011 A1 | 10/2004 | Meeker | |
| 2006/0157110 A1 | 7/2006 | Yeh | |
| 2007/0051068 A1 | 3/2007 | Towerman et al. | |
| 2008/0115416 A1 | 5/2008 | Clark | |
| 2008/0236056 A1 * | 10/2008 | Hourihan | E04B 1/34807 52/79.9 |
| 2009/0026196 A1 | 1/2009 | Leedekerken | |
| 2009/0100769 A1 * | 4/2009 | Barrett | A47K 4/00 52/35 |
| 2010/0058675 A1 * | 3/2010 | Simmons | E04B 1/34807 52/79.1 |
| 2010/0235206 A1 | 9/2010 | Miller et al. | |
| 2011/0056147 A1 * | 3/2011 | Beaudet | E04B 1/3483 52/79.9 |
| 2013/0014451 A1 | 1/2013 | Russell et al. | |
| 2013/0086849 A1 * | 4/2013 | Clouser | E04B 1/34869 52/79.9 |
| 2013/0232685 A1 * | 9/2013 | Cornille | A47K 4/00 4/663 |
| 2013/0335336 A1 | 12/2013 | Esparza et al. | |
| 2014/0327405 A1 | 11/2014 | Carkner | |
| 2015/0300008 A1 | 10/2015 | Gosling et al. | |
| 2015/0354201 A1 | 12/2015 | Gruetering | |
| 2016/0002938 A1 | 1/2016 | Vale et al. | |
| 2016/0148237 A1 | 5/2016 | Ifrach et al. | |

OTHER PUBLICATIONS

U.S. Appl. No. 15/140,785, filed Apr. 28, 2016, entitled Dynamic Interstitial Hotels and Related Technology.

U.S. Appl. No. 15/390,731, filed Dec. 27, 2016, entitled Garages Retrofitted for Alternative Uses and Related Technology.

U.S. Appl. No. 15/456,523, filed Mar. 11, 2017, entitled Commercial Loading, Storage, Parking, and Vehicle-Servicing Spaces Retrofitted for Alternative Uses and Related Technology.

U.S. Appl. No. 15/675,745, filed Aug. 13, 2017, entitled Commercial Storefront Spaces Retrofitted for Alternative Uses and Related Technology.

* cited by examiner

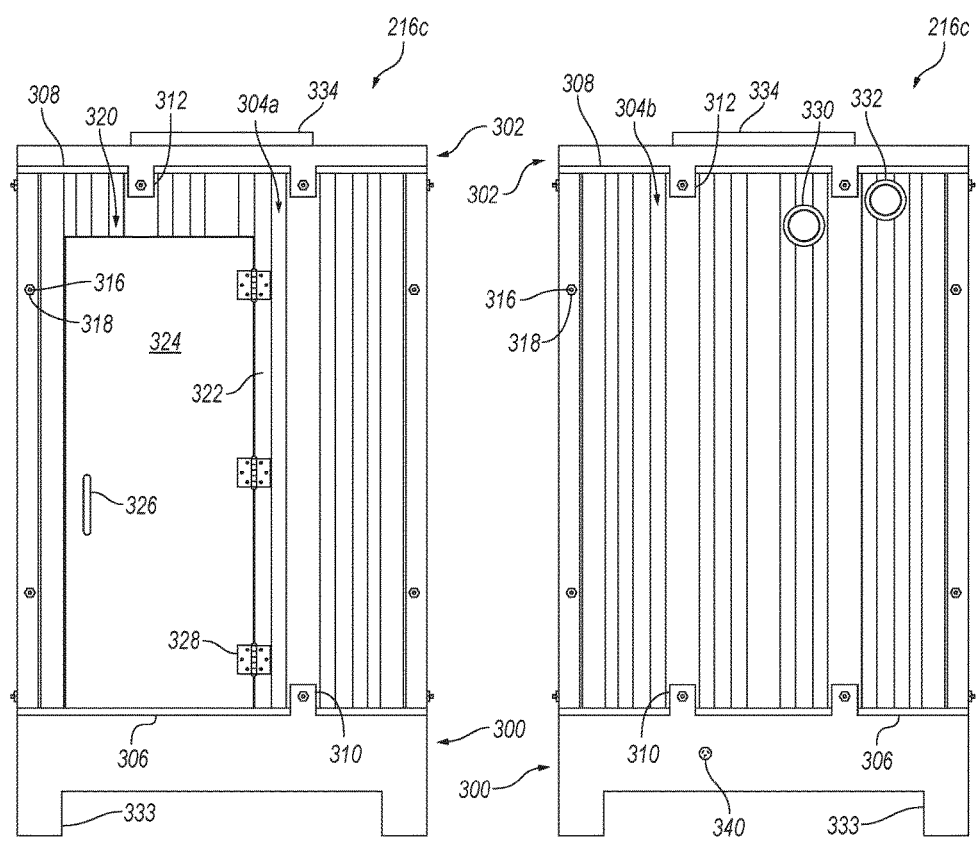
*Fig. 6*   *Fig. 7*

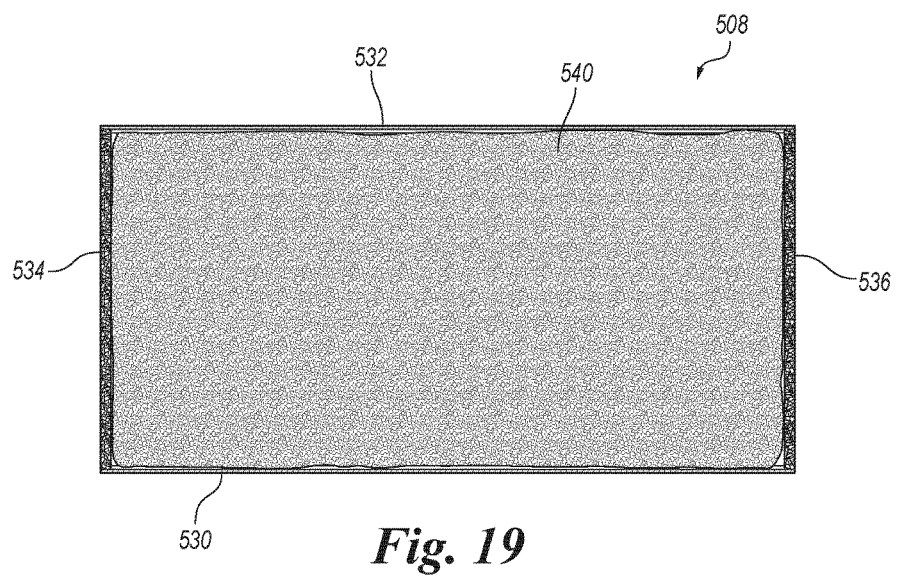
Fig. 19
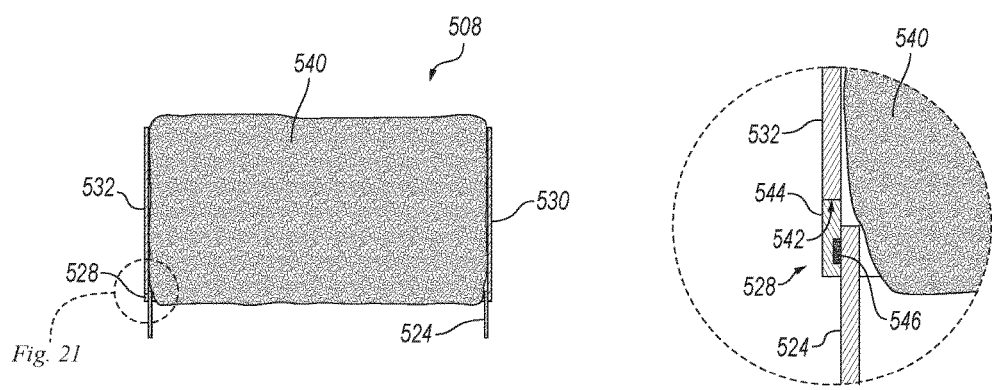
Fig. 20
Fig. 21

US 10,011,982 B1

SCHOOL SPACES RETROFITTED FOR ALTERNATIVE USES AND RELATED TECHNOLOGY

CROSS-REFERENCE TO RELATED APPLICATION AND LIST OF OTHER APPLICATIONS INCORPORATED BY REFERENCE

This claims the benefit of prior U.S. Patent Application No. 62/222,750, filed Sep. 23, 2015, which is incorporated herein by reference in its entirety.

The following applications are also incorporated herein by reference in their entireties:

U.S. Patent Application No. 62/154,209, filed Apr. 29, 2015, entitled "Dynamic Interstitial Hotels and Related Technology,"

U.S. Patent Application No. 62/273,700, filed Dec. 31, 2015, entitled "Garages Retrofitted for Alternative Uses and Related Technology,"

U.S. Patent Application No. 62/310,045, filed Mar. 18, 2016, entitled "Commercial Loading, Storage, Parking, and Vehicle-Servicing Spaces Retrofitted for Alternative Uses and Related Technology,"

U.S. Patent Application No. 62/375,903, filed Aug. 17, 2016, entitled "Commercial Storefront Spaces Retrofitted for Alternative Uses and Related Technology," and U.S. patent application Ser. No. 15/140,785, filed Apr. 28, 2016, entitled "Dynamic Interstitial Hotels and Related Technology."

To the extent the foregoing applications or any other material incorporated herein by reference conflicts with the present disclosure, the present disclosure controls.

TECHNICAL FIELD

This disclosure is related to real estate technology.

BACKGROUND

Building conventional real estate is capital intensive and slow. Accordingly, short-term changes in demand for real estate do not conventionally lead to rapid changes in real estate capacity. For example, markets with high demand for real estate often suffer from insufficient real estate capacity for years before new conventional real estate projects are approved and completed. Peer-to-peer real estate networks mitigate this problem to some degree, but have other significant disadvantages, such as high transaction costs, inconsistent quality, and regulatory issues. Independent of these problems, valuable real estate in major urban areas is often unutilized or under utilized. These and other aspects of conventional real estate represent inefficiencies with the potential to be at least partially addressed by innovation.

BRIEF DESCRIPTION OF THE DRAWINGS

Many aspects of the present technology can be better understood with reference to the following drawings. The relative dimensions in the drawings may be to scale with respect to some embodiments of the present technology. With respect to other embodiments, the drawings may not be to scale. For clarity of illustration, reference-number labels for analogous components or features may be omitted when the appropriate reference-number labels for such analogous components or features are clear in the context of the specification and all of the drawings considered together. Furthermore, the same reference numbers may be used to identify analogous components or features in multiple described embodiments.

FIGS. 4, 5, 6 and 7 are, respectively, a first side profile view, an opposite second side profile view, a first end profile view, and an opposite second end profile view of a bathroom of the collection shown in FIG. 3.

FIG. 19 is a cross-sectional top plan view of the wall component of the compartmentalizing assembly of the collection shown in FIG. 3 taken along the line 19-19 in FIG. 18.

FIG. 20 is a cross-sectional end plan view of the wall component of the compartmentalizing assembly of the collection shown in FIG. 3 taken along the line 20-20 in FIG. 18.

FIG. 21 is an enlarged view of a portion of FIG. 20.

DETAILED DESCRIPTION

Disclosed herein are examples of school spaces retrofitted for alternative uses and related technology. In a particular embodiment of the present technology, a collection of rentable units and associated structures is operated at a school building between successive academic sessions of a school also operated at the school building. The collection can include components well suited for rapid deployment, removal, and redeployment. Use of these components can allow revenue from operating the rentable units to exceed costs associated within transitioning the school building from being well suited for a school use to being well suited for an alternative use, even when the rentable units are only operated for relatively short periods of time. Among various types of real estate, school buildings are particularly well suited to accommodate short-term alternative uses. For example, school buildings are typically unutilized or underutilized during summer months when demand for lodging and certain other alternative uses tends to be high. As another example, school buildings typically have floor plans that include classrooms, which tend to be well sized for use as individual rentable units. As yet another example, school buildings typically have large windows at or near ground level, which tend to be well suited for use as direct access points to individual rentable units.

Specific details of several embodiments of the present technology are disclosed herein with reference to FIGS. 1-37. It should be noted, in general, that other embodiments in addition to those disclosed herein are within the scope of the present technology. For example, embodiments of the present technology can have different configurations, components, and/or operations than those disclosed herein. Moreover, a person of ordinary skill in the art will understand that embodiments of the present technology can have configurations, components, and/or operations in addition to those disclosed herein and that these and other embodiments can be without configurations, components, and/or operations disclosed herein without deviating from the present technology.

Figure 1:
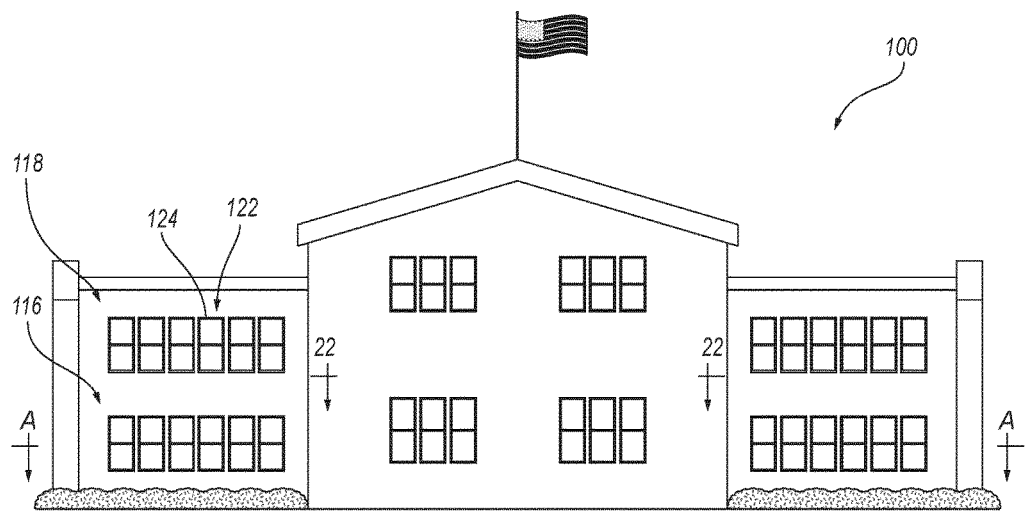
FIG. 1 is a front profile view of a school building in a first state.
Figure 2:
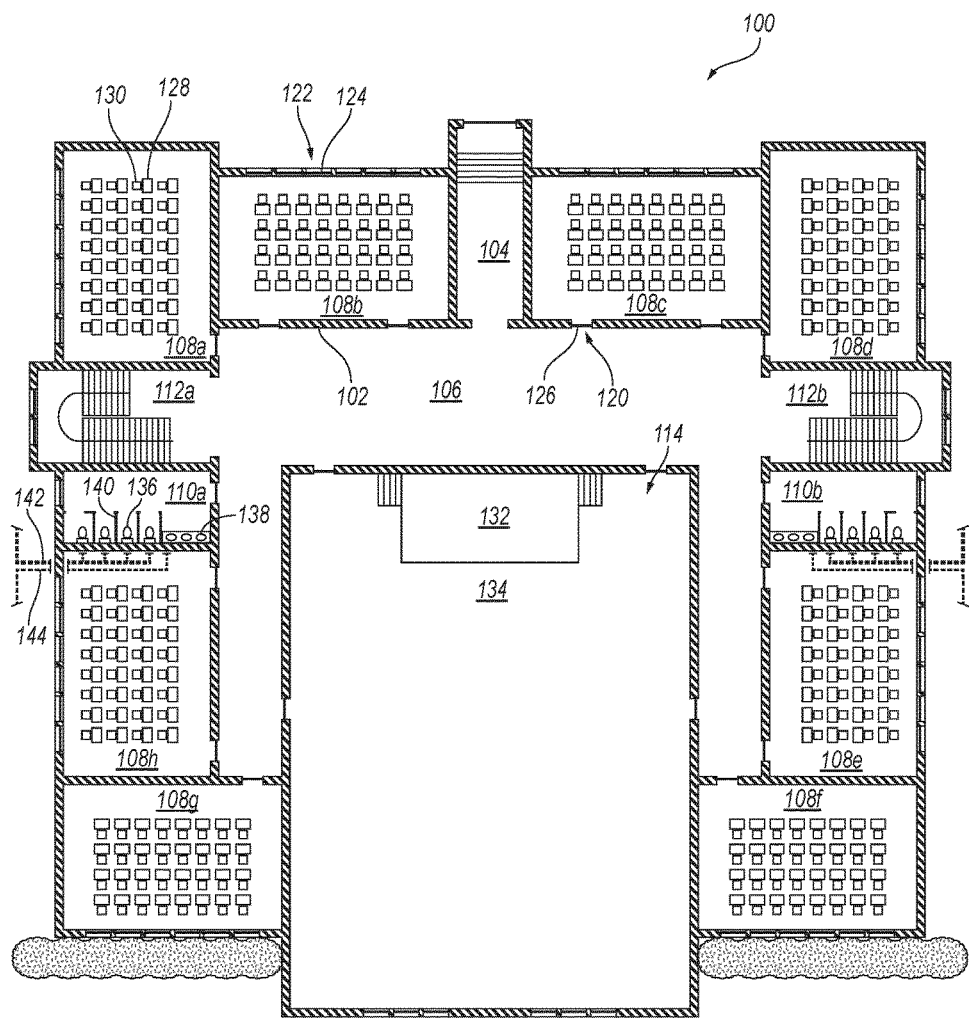
FIG. 2 is a top plan view of the school building shown in FIG. 1 in the first state taken along the line A-A in FIG. 1.

FIG. 1 is a front profile view of a school building 100 in a first state. The first state can be a school-use, original, unretrofitted, pre-retrofit, or similar state. FIG. 2 is a top plan view of the school building 100 in the first state taken along the line A-A in FIG. 1. With reference to FIGS. 1 and 2 together, the school building 100 can have a network of permanent walls 102 and can include a main entrance 104, a hallway 106, classrooms 108 (individually identified as classrooms 108a-108h), school bathrooms 110 (individually identified as school bathrooms 110a, 110b), main stairways 112 (individually identified as main stairways 112a, 112b), and an oversized room 114 (i.e., a room within the school building 100 having a floor area at least twice an average individual floor area of the classrooms 108) at least partially defined by the permanent walls 102. The oversized room 114 can be an auditorium, a gym, a cafeteria, a library, and/or another suitable type of room within the school building 100.

The illustrated school building 100 has a first story 116 (e.g., a ground story) at which a total of eight classrooms 108 are located. The illustrated school building 100 also has a second story 118 at which additional classrooms (not shown) are located. The main stairways 112 operably connect the first and second stories 116, 118. In other embodiments, corresponding school buildings can have different numbers of classrooms and/or different numbers of stories. Furthermore, although features of the present technology may be described herein primarily or entirely with respect to the first story 116 of the school building 100, it should be understood that suitable features of the present technology can additionally or alternatively be practiced with respect to the second story 118 of the school building 100. In embodiments of the present technology practiced at the first story 116 only, the main stairways 112 can be closed off from the hallway 106 when the school building 100 is retrofitted from a first state to a second state to accommodate an alternative use. In embodiments of the present technology practiced at both the first and second stories 116, 118, access to the main stairways 112 from the hallway 106 can be maintained after the school building 100 is retrofitted from the first state to the second state.

The school building 100 can be associated with a school (e.g., a public or private elementary, middle, or high school) and can and can include facilities appropriate for this purpose. In at least some embodiments, the school building 100 is purpose-built for school use. For example, the oversized room 114 can be a purpose-built auditorium, gym, cafeteria, and/or library. The classrooms 108, school bathrooms 110, main stairways 112, and oversized room 114 can be adjacent to the hallway 106. For example, the classrooms 108, school bathrooms 110, and oversized room 114 can include respective doorway openings 120 at the hallway 106. For natural lighting, the classrooms 108, school bathrooms 110, main stairways 112, and oversized room 114 can include respective window openings 122 and sashes 124 disposed (e.g., hingedly or slidably disposed) at the respective window openings 122. The window openings 122 can be double-hung window openings or another type of window opening from which the sashes 124 are readily removable.

The classrooms 108, school bathrooms 110, and oversized room 114 can include doors 126 disposed (e.g., hingedly or slidably disposed) at the corresponding doorway openings 120. When the school building 100 is in the first state, the classrooms 108, the oversized room 114, and the school bathrooms 110 can be directly accessible from the hallway 106 through the corresponding doorway openings 120. Furthermore, the main entrance 104 can be operably connected to the hallway 106 such that the classrooms 108, school bathrooms 110, main stairways 112, and oversized room 114 are accessible from the main entrance 104 via the hallway 106. As discussed below, in some embodiments, the classrooms 108 and the oversized room 114 remain accessible from the hallway 106 after the school building 100 is retrofitted to the second state. In other embodiments, the classrooms 108 and/or the oversized room 114 can be made inaccessible from the hallway 106 after the school building 100 is retrofitted to the second state.

As shown in FIG. 2, school desks 128 and school chairs 130 can be removably disposed within the classrooms 108 in arrangements suitable for accommodating students during classroom instruction. The oversized room 114 can include a stage 132 and a large open area 134 in front of the stage 132. The school bathrooms 110 can include toilets 136 (e.g., two or more toilets 136), sinks 138 (e.g., two or more sinks 138), and a stall assembly 140 operably associated with the toilets 136. The school building 100 can include a plumbing drain trunk line 142 and a water supply trunk line 144 operably associated with the school bathroom 110a. The plumbing drain trunk line 142 can follow a drainage route from the school bathroom 110a toward a sewage destination (e.g., a municipal sewer) (not shown). Similarly, the water supply trunk line 144 can follow a supply route from a water source (e.g., a municipal water source) (not shown) toward the school bathroom 110a. The plumbing drain trunk line 142 can be below-ground, such as positioned below a ground surface outside the school building 100 along the drainage route. In addition or alternatively, the plumbing drain trunk line 142 can be below-floor, such as positioned below a finished floor surface of the school building 100 along the drainage route (e.g., at a portion of the drainage route under the school bathroom 110a). Similarly, the water supply trunk line 144 can be below-ground, such as positioned below a ground surface outside the school building 100 along the supply route. In addition or alternatively, the water supply trunk line 144 can be below-floor, such as positioned below a finished floor surface of the school building 100 along the supply route (e.g., at a portion of the supply route under the school bathroom 110a).

The plumbing drain trunk line 142 and/or the water supply trunk line 144 can be buried or otherwise permanently installed within a basement, a crawlspace, a chase, a foundation, a volume of dirt, or another suitable environment directly below the school bathroom 110a and/or directly below an area around the school bathroom 110a. Furthermore, the plumbing drain trunk line 142 can be sloped to convey liquid waste (e.g., sewage) from the school bathroom 110a toward the sewage destination at least partially by gravity. The water supply trunk line 144 can be configured to convey potable water from the water source to the school bathroom 110a under pressure. In at least some cases, the school building 100 includes a school water heater (not shown) operably associated with the water supply trunk line 144. In these cases, the water supply trunk line 144 can bifurcate into branches (not shown) that supply cold and hot water, respectively, to the school bathroom 110a, such as at the sinks 138. The school water heater can be operably associated with a branch of the water supply trunk line 144 that supplies hot water to the school bathroom 110a.

Figure 3:
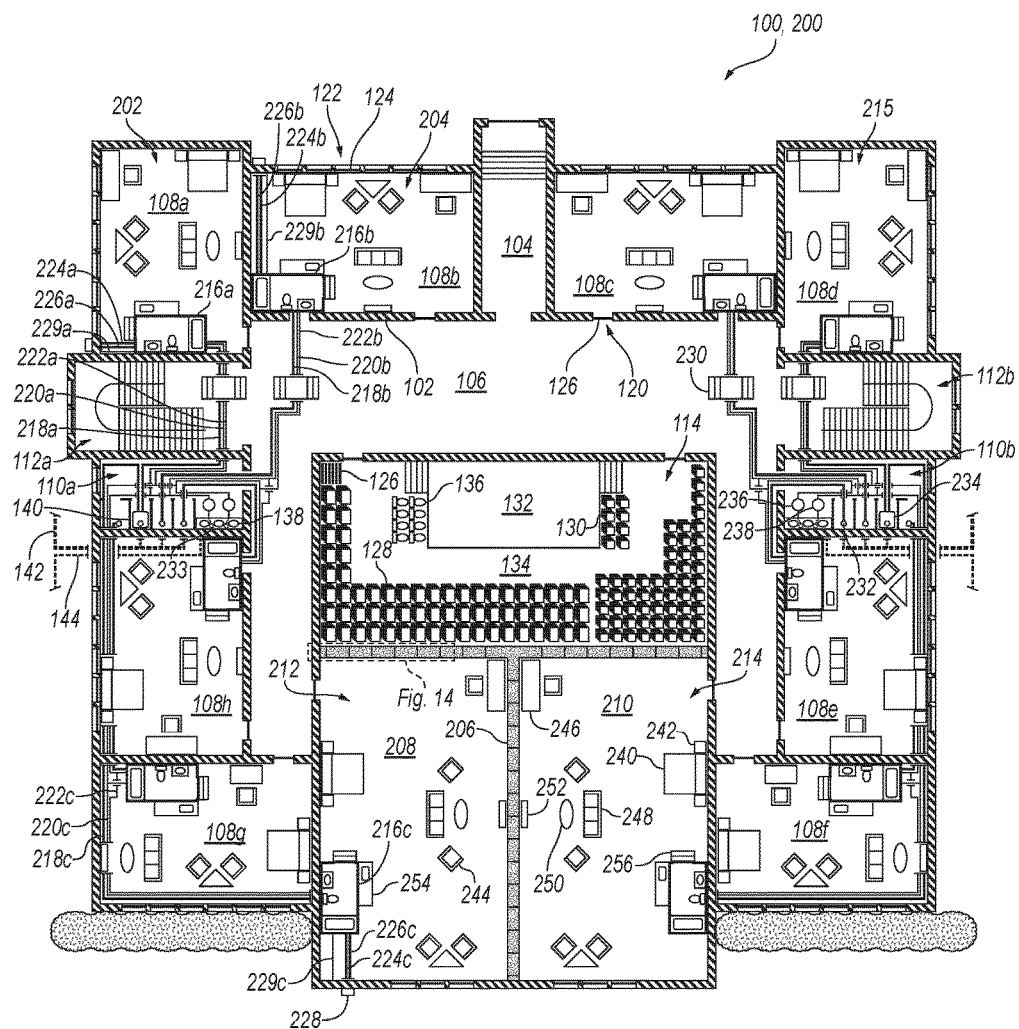
FIG. 3 is a top plan view of a collection of rentable units and associated structures in accordance with an embodiment of the present technology at the school building shown in FIG. 1 in a second state taken along the line A-A in FIG. 1.

FIG. 3 is a top plan view of a collection of rentable units and associated structures 200 in accordance with an embodiment of the present technology at the school building 100 in a second state taken along the line A-A in FIG. 1. The second state can be an alternative-use, non-original, retrofitted, post-retrofit, or similar state. With reference to FIGS. 1-3 together, the school building 100 and portions thereof (e.g., the hallway 106, the classrooms 108, the school bathrooms 110, and the oversized room 114) can be retrofitted (e.g., at least substantially reversibly retrofitted) from the first state to the second state to accommodate the collection 200. This retrofitting can occur well after (e.g., at least 20 years after) the school building 100 was originally constructed. The collection 200 can include retrofits (e.g., at least substantially reversible retrofits) to the school building 100 that change the school building 100 from being well suited for a school use to being well suited for an alternative use. In at least some cases, reversal of all or a portion of these retrofits returns the school building 100 from being well suited for the alternative use to again being well suited for the school use. The school use can occur during successive academic sessions of the school associated with the school building 100. The alternative use can occur during a recess (e.g., a summer recess) between the successive academic sessions. For example, the recess can be one of a series of recesses and the collection 200 can reoccur to accommodate the same or different alternative uses in concert with the series of recesses. The collection 200 can be an annually reoccurring collection. Furthermore, the collection 200 can have a duration of between 5 and 15 weeks between the successive academic sessions of the school.

In at least some cases, retrofits to the school building 100 that support only the alternative use and do not interfere significantly with the school use are permanent, whereas retrofits to the school building 100 that support only the alternative use and would interfere significantly with the school use are reversible. Examples of reversible retrofits include removing, installing, and relocating furniture and fixtures with little or no associated demolition of the permanent walls 102 or other permanent fabric of the school building 100. The school building 100 can be substantially reversibly retrofitted to accommodate the collection 200. For example, a total cost of reversible retrofits to the school building 100 for a given transformation of the school building 100 from being well suited for a school use to being well suited for an alternative use can be greater (e.g., at least 50% greater or at least 100% greater) than a total cost of permanent retrofits to the school building 100 for the given transformation. Capital associated with the alternative use can be readily re-deployable during the school use. In some cases, the alternative use and the collection 200 are active for less than four months, such as less than three months (e.g., between two and three months) between successive transformations of the school building 100. In other cases, the alternative use and the collection 200 can have longer durations.

As shown in FIG. 3, the collection 200 can include a first rentable unit 202 encompassing at least a portion of the classroom 108a, and a second rentable unit 204 encompassing at least a portion of the classroom 108b. Within the oversized room 114, the collection 200 can include a compartmentalizing assembly 206 defining a first compartment 208 and a second compartment 210. The collection 200 can further include a third rentable unit 212 encompassing at least a portion of the first compartment 208, a fourth rentable unit 214 encompassing at least a portion of the second compartment 210, and additional rentable units 215 encompassing at least portions of the classrooms 108c-108h, respectively. Additional features of the illustrated embodiment will now be described at least primarily with regard to the first, second, and third rentable units 202, 204, 212. It should be understood that the same or similar features can be present in the fourth rentable unit 214 and the additional rentable units 215 unless the context clearly indicates otherwise. Similarly, features of other illustrated embodiments may be described at least primarily with respect to counterparts of the first, second, and third rentable units 202, 204, 212 with the understanding that the same or similar features can be present in corresponding counterparts of the fourth rentable unit 214 and corresponding counterparts of the additional rentable units 215 unless the context clearly indicates otherwise.

The first, second, and third rentable units 202, 204, 212 can include respective bathrooms 216 (individually identified as bathrooms 216a-216c) disposed (e.g., removably disposed) in operable association with the classrooms 108a, 108b, and the first compartment 208, respectively. For example, the bathrooms 216a-216c can be removably disposed within the classrooms 108a, 108b, and the first compartment 208, respectively. The bathrooms 216 can be reusable. In the illustrated embodiment, the bathrooms 216 are assemblies of reusable bathroom modules configured for rapid deployment into and removal from the school building 100 in an at least partially disassembled state. For example, the bathrooms 216 can be made up mostly or entirely of reusable modular components. In other embodiments, the bathrooms 216 can be portable bathroom units, such as bathroom units configured for rapid deployment into and removal from the school building 100 without significant disassembly. This deployment and removal can occur by forklift, by dolly, by operation of wheels integrated into the bathrooms 216, or in another suitable manner. In still other embodiments, the bathrooms 216 can have other suitable forms.

The collection 200 can further include plumbing drain lines 218 (individually identified as plumbing drain lines 218a-218c) through which the bathrooms 216 are operably connected, respectively, to the plumbing drain trunk line 142. Similarly, the collection 200 can include cold water supply lines 220 (individually identified as cold water supply lines 220a-220c) through which the bathrooms 216 are operably connected, respectively, to the water supply trunk line 144. Also similarly, the collection 200 can include hot water supply lines 222 (individually identified as hot water supply lines 222a-222c) through which the bathrooms 216 are operably connected, respectively, to the water supply trunk line 144. Thus, in at least some embodiments, the bathrooms 216 are tethered to the plumbing drain trunk line 142 and the water supply trunk line 144. The plumbing drain lines 218, cold water supply lines 220, and hot water supply lines 222 can be removably disposed inside and/or outside the school building 100. For example, the plumbing drain lines 218, cold water supply lines 220, and hot water supply lines 222 can be temporary and configured for reuse or disposal after the collection 200 is decommissioned. Alternatively, the plumbing drain lines 218, cold water supply lines 220, and hot water supply lines 222 can be permanently disposed inside and/or outside the school building 100, such as in a manner that does not interfere significantly with the school use of the school building 100.

The collection 200 can further include plumbing ventilation lines 224 (individually identified as plumbing ventilation lines 224a-224c) and exhaust lines 226 (individually identified as exhaust lines 226a-226c) through which the bathrooms 216 are operably connected, respectively, to an exterior of the school building 100. For example, the collection 200 can include exhaust filters 228 (e.g., containing activated carbon) disposed (e.g., removably disposed) on suitable exterior surfaces of the permanent walls 102, and the plumbing ventilation lines 224 and exhaust lines 226 can extend between the bathrooms 216 and the exhaust filters 228. The collection 200 can still further include electrical lines 229 (individually identified as electrical lines 229a-229c) through which the bathrooms 216 are operably connected, respectively, to electrical outlets (not shown) on interior surfaces of the permanent walls 102. For clarity of illustration, counterparts of the plumbing ventilation lines 224, the exhaust lines 226, the exhaust filters 228, and the electrical lines 229 are not shown for bathrooms of the collection 200 other than the bathrooms 216a-216c. Nor are counterparts of the plumbing ventilation lines 224, the exhaust lines 226, the exhaust filters 228, and the electrical lines 229 shown for bathrooms of the collections illustrated in FIGS. 25, 26 and 31-35, as described below. It should be understood that counterparts of the plumbing ventilation lines 224, the exhaust lines 226, the exhaust filters 228, and the electrical lines 229 can be present for any of the other bathrooms of the collection 200 and the bathrooms of the collections 600, 700, 1000, 1100, 1200, 1300, 1400 illustrated in FIGS. 25, 26 and 31-35.

With reference again to FIG. 3, in the illustrated embodiment, the plumbing drain line 218a, the cold water supply line 220a, and the hot water supply line 222a extend along respective drainage or supply routes between the bathroom 216a and the school bathroom 110a via the main stairway 112a and retrofitted openings (not shown) in the permanent walls 102. The plumbing drain line 218b, the cold water supply line 220b, and the hot water supply line 222b extend between the bathroom 216b and the school bathroom 110a via one of the doorway openings 120 of the classroom 108b, the hallway 106, and the doorway opening 120 of the school bathroom 110a. The plumbing drain line 218c, the cold water supply line 220c, and the hot water supply line 222c extend between the bathroom 216c and the school bathroom 110a via the classroom 108g, the classroom 108h, and retrofitted openings (not shown) in the permanent walls 102. In other embodiments, the plumbing drain lines 218, cold water supply lines 220, and hot water supply lines 222 can have other suitable drainage and/or supply routes within the school building 100 and/or outside of the school building 100. When present, the retrofitted openings in the permanent walls 102 can be at least substantially reversible. For example, the retrofitted openings can be formed when the school building 100 is initially retrofitted to accommodate the collection 200 in a manner that allows the retrofitted openings to be conveniently reclosed when the collection 200 is decommissioned. In a particular example, the retrofitted openings are outfitted with cabinet-style doors (not shown) that can be maintained open when the retrofitted openings are in use and maintained closed when the retrofitted openings are not in use.

The plumbing drain lines 218, cold water supply lines 220, and hot water supply lines 222 can be above-ground, such as positioned above a ground surface outside the school building 100 along the corresponding drainage or supply routes. In addition or alternatively, the plumbing drain lines 218, cold water supply lines 220, and hot water supply lines 222 can be above-floor, such as positioned above a finished floor surface of the school building 100 along the corresponding drainage or supply routes. Furthermore, the plumbing drain lines 218, cold water supply lines 220, and hot water supply lines 222 can have respective lengths of at least two meters (e.g., at least four meters). In the illustrated embodiment, the plumbing drain line 218a, the plumbing drain line 218b, the cold water supply line 220a, the cold water supply line 220b, the hot water supply line 222a, and the hot water supply line 222b are above-floor and extend over respective lengths of at least two meters (e.g., at least four meters) within the hallway 106. The plumbing drain line 218c, the cold water supply line 220c, and the hot water supply line 222c are also above-floor and extend over respective lengths of at least two meters (e.g., at least four meters) within the classrooms 108g, 108h. In other embodiments, all of the plumbing drain lines 218, cold water supply lines 220, and hot water supply lines 222 can have respective lengths of at least two meters (e.g., at least four meters) within the hallway 106, within suitable combinations of the classrooms 108, and/or elsewhere within or outside the school building 100.

The plumbing drain lines 218 can be sloped to convey liquid waste from the corresponding bathrooms 216 toward the plumbing drain trunk line 142 (e.g., via the school bathroom 110a) at least partially by gravity. To facilitate this sloping and/or for other reasons, the bathrooms 216 can have respective floor levels at least 0.5 meter (e.g., at least 1 meter) higher than corresponding underlying floor levels of the school building 100, such as floor levels at the classrooms 108a, 108b and the first compartment 208, respectively. As shown in FIG. 3, the collection 200 can include bridges 230 disposed over respective bundles of the plumbing drain lines 218, cold water supply lines 220, and hot water supply lines 222. Like many other components of the collection 200, the bridges 230 can be reusable and removably disposed within the school building 100. The bridges 230 can be useful, for example, to facilitate pedestrian traversal of the bundles when the hallway 106 is accessible to occupants of the first, second, and third rentable units 202, 204, 212.

Retrofits to the school building 100 that cause the school building 100 to adapt from being well suited for a school use to being well suited for an alternative use can include removing the school desks 128, school chairs 130, and toilets 136 from their respective locations when the school building 100 is in the first state (e.g., their respective locations shown in FIG. 2). In the illustrated embodiment, the school desks 128, school chairs 130, and toilets 136 are stowed compactly (e.g., close together and/or stacked) within the oversized room 114. In other embodiments the school desks 128, school chairs 130, and toilets 136 can be removed from the school building 100 or stored in another suitable location within the school building 100. The retrofits can further include removing some or all of the doors 126. For example, FIG. 3 shows that the door 126 at the doorway opening 120 of the school bathroom 110a and the door 126 at one of the doorway openings 120 of the classroom 108b are removed to facilitate passage of the plumbing drain line 218b, the cold water supply line 220b, and the hot water supply line 222b between the bathroom 216b and the school bathroom 110a. The bathroom 216b can be positioned within the classroom 108b such that access to the classroom 108b via the doorless doorway opening 120 of the classroom 108b is blocked. The retrofits can also include forming the openings in the permanent walls 102 through which the plumbing drain lines 218a, 218c, the cold water supply lines 220a, 220c, the hot water supply lines 222a, 222c, the plumbing ventilation lines 224, and the exhaust lines 226 extend. Forming these openings and suitable other retrofits of the school building 100 can be permanent and completed in conjunction with an initial adaptation of the school building 100 from being well suited for the school use to being well suited for the alternative use. These permanent retrofits can then be reused in conjunction with streamlined subsequent adaptations of the school building 100 from being well suited for the school use to being well suited for the alternative use.

The school bathroom 110a can include toilet hookups 232 that are exposed when the toilets 136 are removed. Similarly, the school bathroom 110a can include sink hookups 233 that are exposed when the sinks 138 are disconnected. The bathrooms 216 and the plumbing drain lines 218 can be operably connected to the plumbing drain trunk line 142 via the toilet hookups 232. Similarly, the bathrooms 216 and the cold and hot water supply lines 220, 222 can be operably connected to the water supply trunk line 144 via the sink hookups 233. In the illustrated embodiment, the collection 200 includes a sewage detention tank 234, a cold water reservoir 236, and a hot water reservoir 238 removably disposed within the school bathroom 110a, such as removably disposed above a finished floor surface of the school bathroom 110a. In other embodiments, the sewage detention tank 234, the cold water reservoir 236, and the hot water reservoir 238 can be permanently disposed within the school bathroom 110a, removably or permanently disposed within the hallway 106, or removably or permanently disposed elsewhere within the school building 100 or outside the school building 100.

The sewage detention tank 234 can be useful, for example, to increase a capacity of the school bathroom 110a to remove liquid waste from the bathrooms 216. As shown in FIG. 3, the total number of the bathrooms 216 and counterpart bathrooms operably connected to the school bathroom 110a can exceed a total number of toilet hookups 232 within the school bathroom 110a. Accordingly, in the illustrated embodiment, while the plumbing drain line 218b is operably connected to the plumbing drain trunk line 142 via one of the toilet hookups 232 in a dedicated manner, the plumbing drain lines 218a, 218c share another of the toilet hookups 232. The bathrooms 216a, 216c and the plumbing drain lines 218a, 218c can be operably connected to the plumbing drain trunk line 142 via the sewage detention tank 234, which, in turn, can be operably connected to the plumbing drain trunk line 142 via one of the toilet hookups 232.

Due to the presence of the sewage detention tank 234, spikes in flow through the plumbing drain lines 218a, 218c can be attenuated, thereby increasing the effective capacity of the school bathroom 110a to handle liquid waste. Similarly, the cold and hot water reservoirs 236, 238 can increase a capacity of the school bathroom 110a to supply cold and hot water, respectively, to the bathrooms 216. The bathrooms 216 can be operably connected to the water supply trunk line 144 via the cold and hot water reservoirs 236, 238. In at least some cases, the sinks 138 are disconnected to allow for operable connection of the cold and hot water reservoirs 236, 238 to the water supply trunk line 144 via the sink hookups 233. In these and other cases, the hot water reservoir 238 can include a heater to boost the capacity of an existing school water heater (not shown) along a branch of the water supply trunk line 144 that supplies hot water to the school bathroom 110a. When the bathrooms 216 include showers and in other cases, the hot-water demand associated with the collection 200 can significantly exceed that of the school building 100 during the school use. Use of a heater in conjunction with the hot water reservoir 238 can at least partially address this deficiency. In a similar manner, the collection 200 can include other suitable components for increasing or otherwise modifying the capacity of permanent systems of the school building 100. For example, the collection 200 can include an electrical generator (not shown) operably connected to the first, second, and third rentable units 202, 204, 212 to increase the capacity of permanent electrical system (not shown) of the school building 100.

Each of the first, second, and third rentable units 202, 204, 212 can be furnished or otherwise outfitted with suitable furnishings, fixtures, accessories, etc. to accommodate a corresponding alternative use. In the illustrated embodiment, the first, second, and third rentable units 202, 204, 212 are respective lodging units with suitable furnishings, fixtures, accessories, etc. to accommodate lodging use. For example, each of the first, second, and third rentable units 202, 204, 212 can include a bed 240, side tables 242, upholstered chairs 244, a writing table 246, a sofa 248, coffee tables 250, a television 252, a kitchenette 254, and a set of step stairs 256. The kitchenettes 254 and the sets of step stairs 256 can be operably associated with the corresponding bathrooms 216. In other embodiments, the first, second, and third rentable units 202, 204, 212 can include other suitable furnishings, fixtures, accessories, etc. Furthermore, the furnishings, fixtures, accessories, etc. of the first, second, and third rentable units 202, 204, 212 need not be consistent. In some cases, the first, second, and third rentable units 202, 204, 212 accommodate different types of alternative uses and/or accommodate the same type of alternative use, but have dissimilar furnishings, fixtures, accessories, etc. As described in further detail below, the first, second, and third rentable units 202, 204, 212 can accommodate lodging uses, residential uses (e.g., short-term residential uses), office uses (e.g., short-term office uses), assembly uses (e.g., short-term assembly uses), and combinations thereof, among other possible types of alternative uses.

FIGS. 4, 5, 6 and 7 are, respectively, a first side profile view, an opposite second side profile view, a first end profile view, and an opposite second end profile view of the bathroom 216c. The bathroom 216c will now be described with the understanding that the bathrooms 216a, 216b can have the same or similar features. With reference to FIGS. 4-7 together, the bathroom 216c can include a rectangular floor module 300, a rectangular ceiling module 302 vertically spaced apart from the floor module 300, and a plurality of wall modules 304 (individually identified as wall modules 304a-304d) removably connected to the floor and ceiling modules 300, 302 at respective perimeter portions of the floor and ceiling modules 300, 302. The bathroom 216c can further include a lower gasket 306 disposed between the perimeter portion of the floor module 300 and the wall modules 304, and an upper gasket 308 disposed between the perimeter portion of the ceiling module 302 and the wall modules 304. The floor module 300 can include upwardly extending tabs 310 through which the floor module 300 is secured to the wall modules 304. Similarly, the ceiling module 302 can include downwardly extending tabs 312 through which the ceiling module 302 is secured to the wall modules 304. The wall modules 304c, 304d can include vertical flanges 314 at which the wall modules 304c, 304d are secured to the wall modules 304a, 304b. The bathroom 216c can include bolts 316 and associated nuts 318 at the upwardly extending tabs 310, the downwardly extending tabs 312, and the vertical flanges 314.

At the wall module 304a (FIG. 6), the bathroom 216c can include a doorway opening 320, a frame 322 extending around the doorway opening 320, and a door 324 disposed within the doorway opening 320 and hingedly connected to the frame 322. The bathroom 216c can further include a handle 326 and hinges 328 operably associated with the door 324. At the wall module 304b (FIG. 7), the bathroom 216c can include a plumbing ventilation hookup 330 and an exhaust hookup 332. The plumbing ventilation hookup 330 and the exhaust hookup 332 can be configured for convenient connection to and disconnection from the plumbing ventilation line 224c and the exhaust line 226c (FIG. 3), respectively, such as via quick release couplings (not shown). The wall modules 304c, 304d can extend between the wall modules 304a, 304b at opposite sides of the bathroom 216c. As discussed above, the bathroom 216c can be configured to be elevated above a floor surface of the first compartment 208. For this purpose and/or another suitable purpose, the floor module 300 can include feet 333. In at least some embodiments, a gap between the feet 333 is large enough to allow the bathroom 216c, when fully assembled, to be conveniently moved by forklift. At the ceiling module 302, the bathroom 216c can include skylights 334 that allow ambient light within the first compartment 208 to enter an interior of the bathroom 216c.

At a side of the floor module 300 below the wall module 304c, the bathroom 216c can include a main plumbing drain hookup 335, a main cold water supply hookup 336, and a main hot water supply hookup 338. At an end of the floor module 300 below the wall module 304b, the bathroom 216c can include a main electrical hookup 340. The main plumbing drain hookup 335, the main cold water supply hookup 336, the main hot water supply hookup 338, and the main electrical hookup 340 can be configured for convenient connection to and disconnection from the plumbing drain line 218c, the cold water supply line 220c, the hot water supply line 222c, and the electrical line 229c, respectively, such as via quick release couplings (not shown). At a side of the floor module 300 below the wall module 304d, the bathroom 216c can include an auxiliary plumbing drain hookup 342, an auxiliary cold water supply hookup 344, an auxiliary hot water supply hookup 346, and an auxiliary electrical hookup 348. The auxiliary plumbing drain hookup 342, the auxiliary cold water supply hookup 344, the auxiliary hot water supply hookup 346, and the auxiliary electrical hookup 348 can be configured for convenient connection to and disconnection from corresponding lines (not shown) of the kitchenette 254, such as via quick release couplings (not shown).

Figure 4:
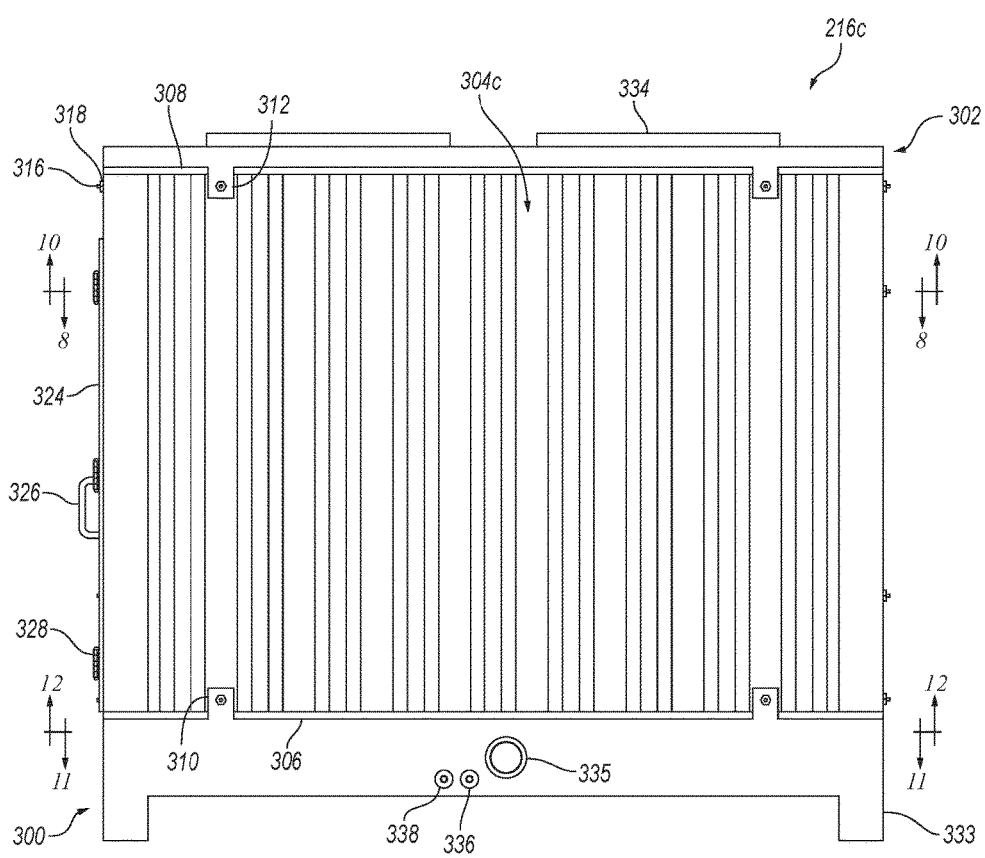
Figure 5:
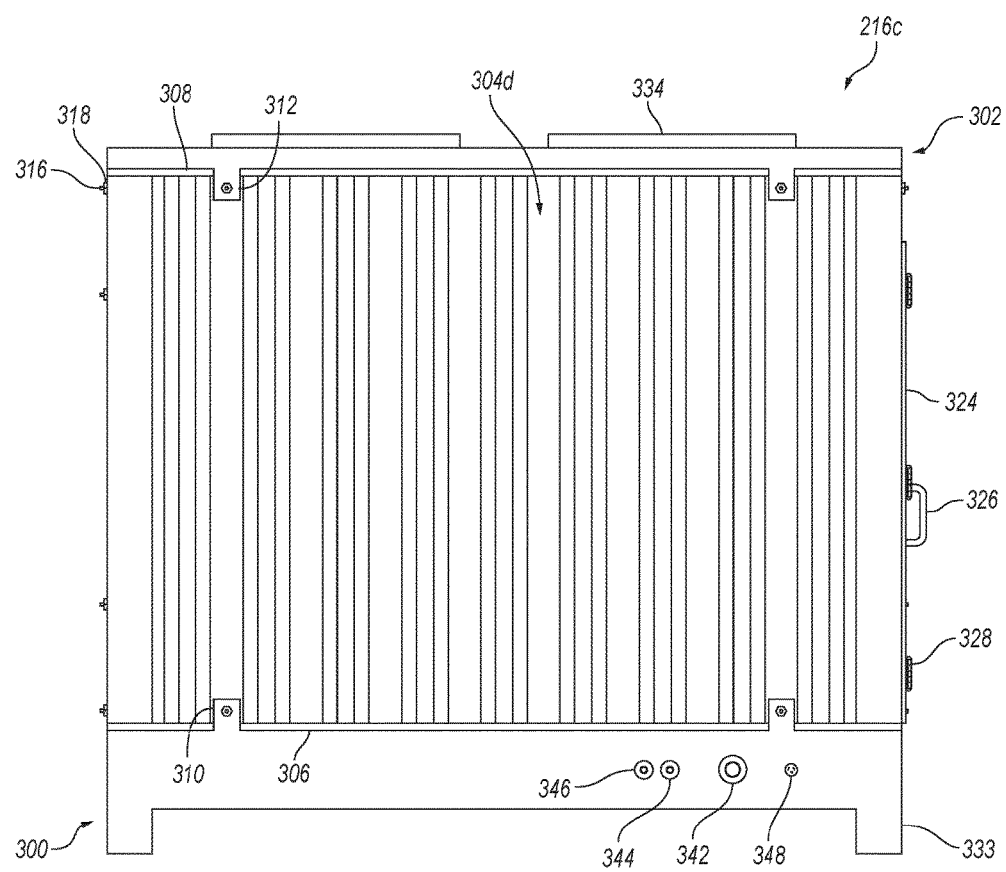
Figure 8:
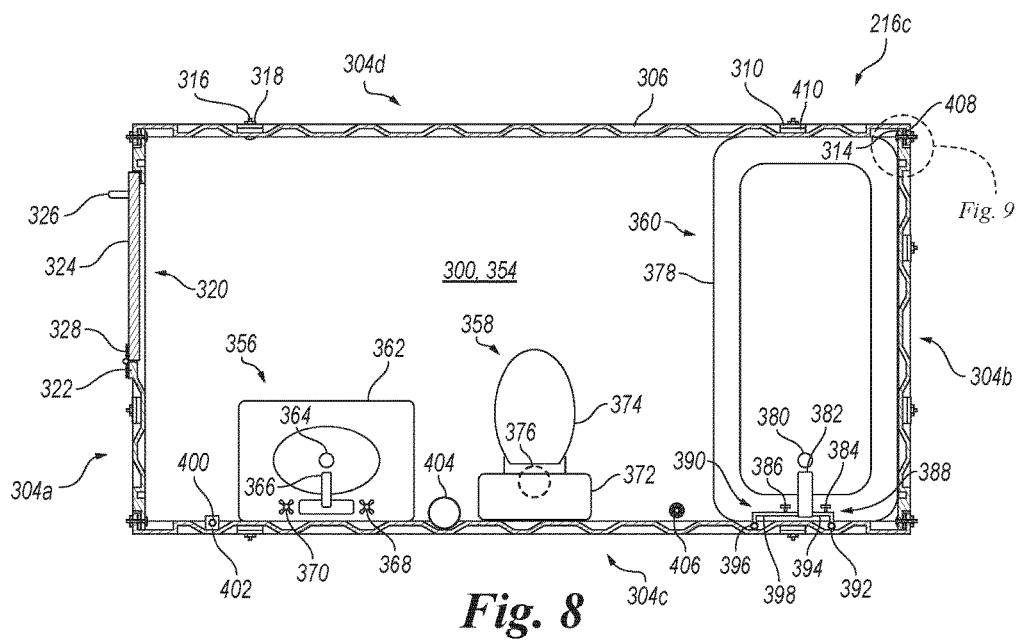
FIG. 8 is a cross-sectional top plan view of the bathroom of the collection shown in FIG. 3 taken along the line 8-8 in FIG. 4.

FIG. 8 is a cross-sectional top plan view of the bathroom 216c taken along the line 8-8 in FIG. 4. As shown in FIG. 8, the floor module 300 can include a deck 354, and the bathroom 216c can include a sink 356, a toilet 358, and a bathtub/shower 360 disposed (e.g., removably disposed) on the deck 354. The sink 356 can include a basin 362, a sink drain 364, a sink faucet 366, a sink hot water knob 368, and a sink cold water knob 370 operably connected to one another. The toilet 358 can include a tank 372, a bowl 374, and a toilet drain 376 operably connected to one another. The bathtub/shower 360 can include a tub 378, a tub drain 380, a tub faucet 382, a tub cold water knob 384, a tub hot water knob 386, a cold water conduit 388, and a hot water conduit 390 operably connected to one another. The cold water conduit 388 can include a riser 392 and a first branch 394 extending between the riser 392 and the tub faucet 382. The tub cold water knob 384 can be disposed along the first branch 394 and operable to control a flow of cold water from the cold water conduit 388 to the tub faucet 382. Similarly, the hot water conduit 390 can include a riser 396 and a first branch 398 extending between the riser 396 and the tub faucet 382. The tub hot water knob 386 can be disposed along the first branch 398 and operable to control a flow of hot water from the hot water conduit 390 to the tub faucet 382.

Figure 9:
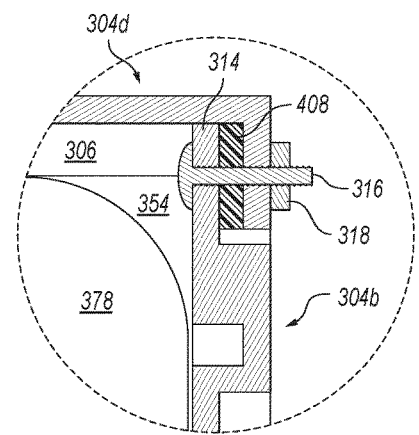
FIG. 9 is an enlarged view of a portion of FIG. 8.

The bathroom 216c can further include an electrical conduit 400, a junction box 402 operably connected to the electrical conduit 400, a plumbing ventilation conduit 404 disposed between the sink 356 and the toilet 358, and a floor drain 406 disposed between the toilet 358 and the bathtub/shower 360. FIG. 9 is an enlarged view of a portion of FIG. 8. With reference to FIGS. 8 and 9 together, the bathroom 216c can include vertical gaskets 408 disposed between the respective vertical flanges 314 and corresponding portions of the wall modules 304a, 304b. Similarly, the bathroom 216c can include lower tab gaskets 410 disposed between the respective upwardly extending tabs 310 and corresponding portions of the wall modules 304.

Figure 10:
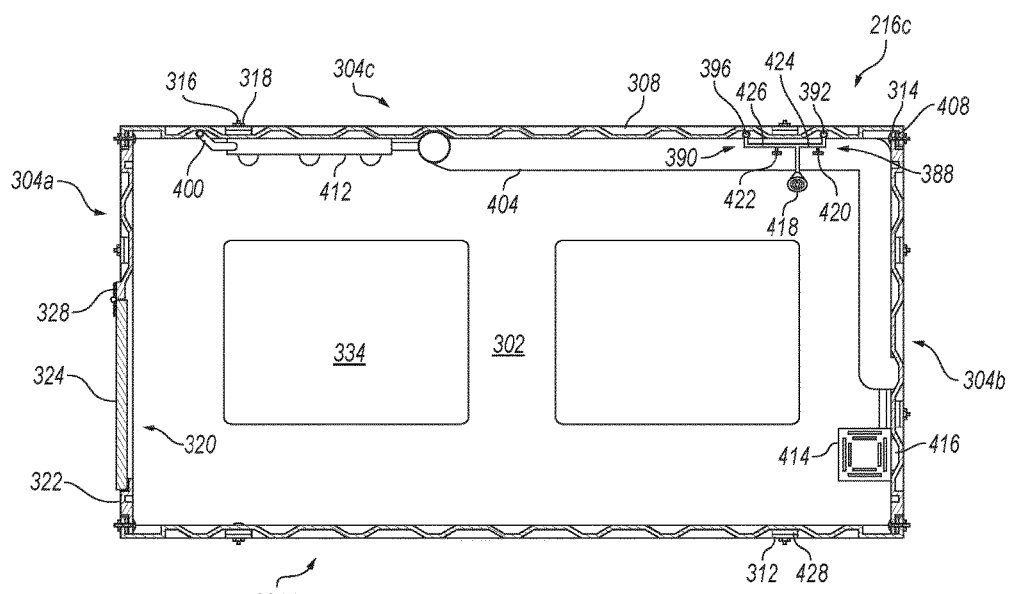
FIG. 10 is a cross-sectional bottom plan view of the bathroom of the collection shown in FIG. 3 taken along the line 10-10 in FIG. 4.

FIG. 10 is a cross-sectional bottom plan view of the bathroom 216c taken along the line 10-10 in FIG. 4. As shown in FIG. 10, the bathroom 216c can include a light fixture 412 attached to the wall module 304c above the sink 356. The bathroom 216c can further include an exhaust intake fan 414 attached to the ceiling module 302. The electrical conduit 400 can extend from the junction box 402 (FIG. 8) to the light fixture 412, and from the light fixture 412 to the exhaust intake fan 414. The plumbing ventilation conduit 404 can extend along an inner corner between the ceiling module 302 and the wall modules 304b, 304c to the plumbing ventilation hookup 330 (FIG. 7). The bathroom 216c can include an exhaust conduit 416 extending between the exhaust intake fan 414 and the exhaust hookup 332 (FIG. 7). Above one end of the tub 378 (FIG. 8), the bathtub/shower 360 (FIG. 8) can include a showerhead 418, a shower cold water knob 420 operably connected to the cold water conduit 388, and a shower hot water knob 422 operably connected to the hot water conduit 390. The cold water conduit 388 can include a second branch 424 extending between the riser 392 and the showerhead 418. The shower cold water knob 420 can be disposed along the second branch 424 and operable to control a flow of cold water from the cold water conduit 388 to the showerhead 418. Similarly, the hot water conduit 390 can include a second branch 426 extending between the riser 396 and the showerhead 418. The shower hot water knob 422 can be disposed along the second branch 426 and operable to control a flow of hot water from the hot water conduit 390 to the showerhead 418. The bathroom 216c can include upper tab gaskets 428 disposed between the respective downwardly extending tabs 312 and corresponding portions of the wall modules 304.

Figure 11:
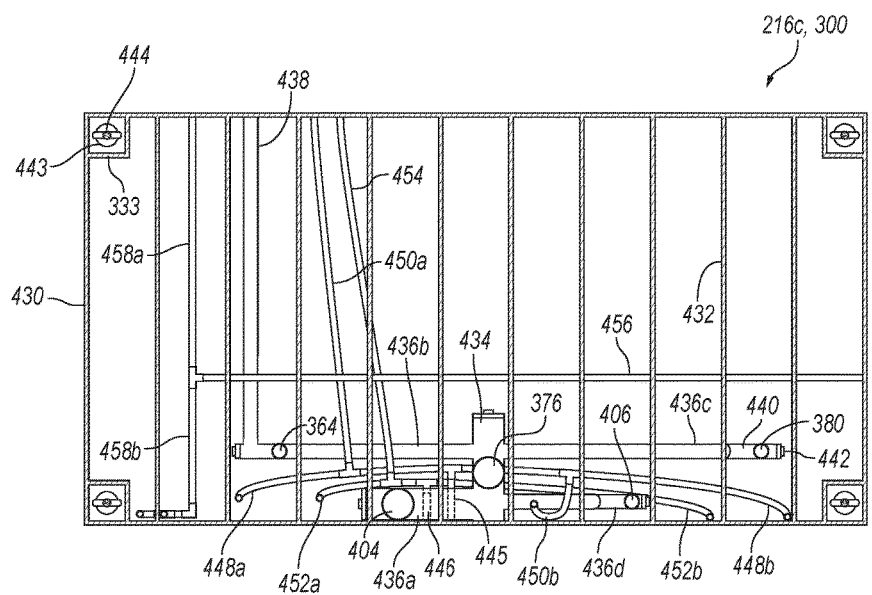
FIG. 11 is a cross-sectional top plan view of the bathroom of the collection shown in FIG. 3 taken along the line 11-11 in FIG. 4.

FIG. 11 is a cross-sectional top plan view of the bathroom 216c taken along the line 11-11 in FIG. 4. With reference to FIGS. 4, 5, 8 and 11 together, the floor module 300 can include a skirt 430 and a series of parallel spaced-apart joists 432 within the skirt 430. The bathroom 216c can include a main plumbing drain conduit 434 operably connected to the main plumbing drain hookup 335 and the toilet drain 376. The main plumbing drain conduit 434 can include branches 436 (individually identified as branches 436a-436d) operably connected to the plumbing ventilation conduit 404, the sink drain 364, the tub drain 380, and the floor drain 406, respectively. The main plumbing drain conduit 434 can further include a sub-branch 438 operably connected to the auxiliary plumbing drain hookup 342 via the branch 436b. The branches 436c, 436d can include respective traps 440. Furthermore, the main plumbing drain conduit 434 and the branches 436 can include respective caps 442. The bathroom 216c can include wheels 443 (e.g., swivel casters) integrated into the floor module 300. In the illustrated embodiment, the wheels 443 are embedded within the feet 333 and accessible via inwardly facing openings (not shown) of the feet 333. The individual wheels 443 can be movable between a retracted state and an extended state. For example, the bathroom 216c can include posts 444 having threads (not shown) that engage corresponding threads (not shown) of the wheels 443 such that the wheels 443 can be rotatably moved between the retracted and extended states. Moving the wheels 443 from the retracted state to the extended state can lift the bathroom 216c off a corresponding floor surface, thereby allowing the bathroom 216c to be conveniently moved along the floor surface.

The bathroom 216c can further include a main cold water conduit 445 and a main hot water conduit 446 operably connected to the main cold water supply hookup 336 and the main hot water supply hookup 338, respectively. The main cold water conduit 445 can include branches 448 (individually identified as branches 448a, 448b) operably connected to the sink 356 and the bathtub/shower 360 (via the riser 392), respectively. The main cold water conduit 445 can further include a sub-branch 450a operably connected to the auxiliary cold water supply hookup 344 via the branch 448a. The main cold water conduit 445 can still further include a sub-branch 450b operably connected to the toilet 358 via the branch 448b. The main hot water conduit 446 can include branches 452 (individually identified as branches 452a, 452b) operably connected to the sink 356 and the bathtub/shower 360 (via the riser 396), respectively. The main hot water conduit 446 can further include a sub-branch 454 operably connected to the auxiliary hot water supply hookup 346 via the branch 452a. The bathroom 216c can still further include a main electrical conduit 456 operably connected to the main electrical hookup 340. The main electrical conduit 456 can include branches 458 (individually identified as branches 458a, 458b) operably connected to the electrical conduit 400 and the auxiliary electrical hookup 348, respectively.

Figure 12:
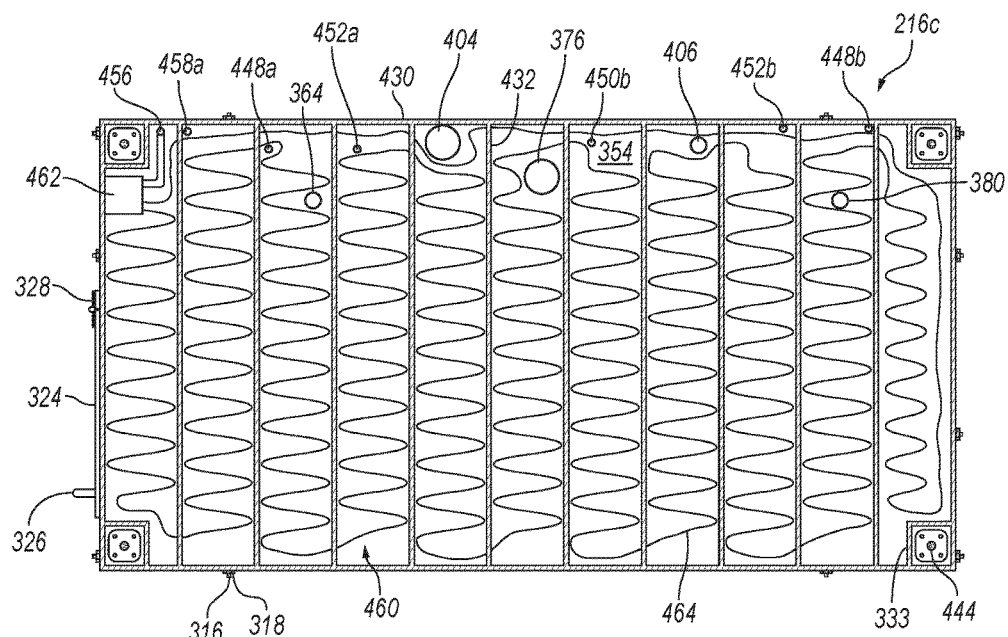
FIG. 12 is a cross-sectional bottom plan view of the bathroom of the collection shown in FIG. 3 taken along the line 12-12 in FIG. 4.

FIG. 12 is a cross-sectional bottom plan view of the bathroom 216c taken along the line 12-12 in FIG. 4. As shown in FIG. 12, the bathroom 216c can include a floor heating system 460 operably associated with the deck 354. The floor heating system 460 can include a control box 462 operably connected to the main electrical conduit 456, and a heating cable 464 operably connected to the control box 462. The heating cable 464 can have a serpentine configuration and be directly connected to an underside of the deck 354 between the joists 432. With reference to FIGS. 4-12 together, the floor drain 406, the main plumbing drain conduit 434 (e.g., including its branches 436 and sub-branch 438), the main cold water conduit 445 (e.g., including its branches 448 and sub-branch 450), the main hot water conduit 446 (e.g., including its branches 452 and sub-branch 454), the main electrical conduit 456 (e.g., including its branches 458), the floor heating system 460, and/or other suitable components of the bathroom 216c can be pre-installed components of the floor module 300. Similarly, the supply plumbing for the bathtub/shower 360 (e.g., including the tub faucet 382, the cold water conduit 388, the hot water conduit 390, and the showerhead 418), the light fixture 412, and/or other suitable components of the bathroom 216c can be pre-installed components of the wall module 304c. These and/or other aspects of the bathroom 216c can facilitate rapid deployment, removal, and redeployment of the bathroom 216c.

Figure 13:
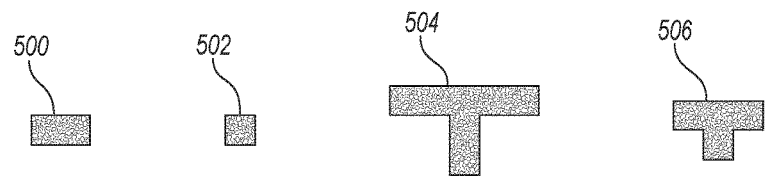
FIG. 13 is top plan view of wall components types included in a compartmentalizing assembly of the collection shown in FIG. 3.

FIG. 13 is top plan view of wall component types included in the compartmentalizing assembly 206 (FIG. 3). As further described below, the compartmentalizing assembly 206 can be made up mostly or entirely of reusable modular components. For example, the compartmentalizing assembly 206 can include staggered rows of wall components of a first type 500. At portions of the compartmentalizing assembly 206 closest to the permanent walls 102, the compartmentalizing assembly 206 can include wall components of a second type 502 respectively disposed at every other row of the compartmentalizing assembly 206 between the wall components of the first type 500. In at least some embodiments, the wall components of the first type 500 have rectangular footprints with aspect ratios of 2:1. In these and other embodiments, the wall components of the second type 502 can have square footprints. Thus, when seams between the wall components of the first type 500 are evenly staggered row-to-row, the wall components of the second type 502 can cap the short rows, thereby giving the compartmentalizing assembly 206 vertical end portions at or near the permanent walls 102. Similarly, the compartmentalizing assembly 206 can include wall components of a full-size third type 504 and wall components of a reduced-size fourth type 506 that can alternatingly stacked to form a T-shaped intersection of the compartmentalizing assembly 206. In other embodiments, corresponding compartmentalizing assemblies can include full-size and reduced-size L-shaped wall components that can be stacked to form an L-shaped intersection, full-size and reduced-size cross-shaped wall components that can be stacked to form a cross-shaped intersection, and/or wall components of other suitable forms.

Figure 14:
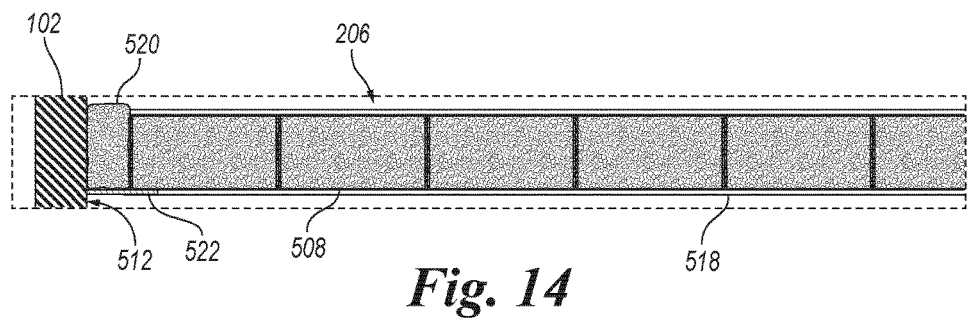
FIG. 14 is an enlarged view of a portion of FIG. 3.
Figure 15:
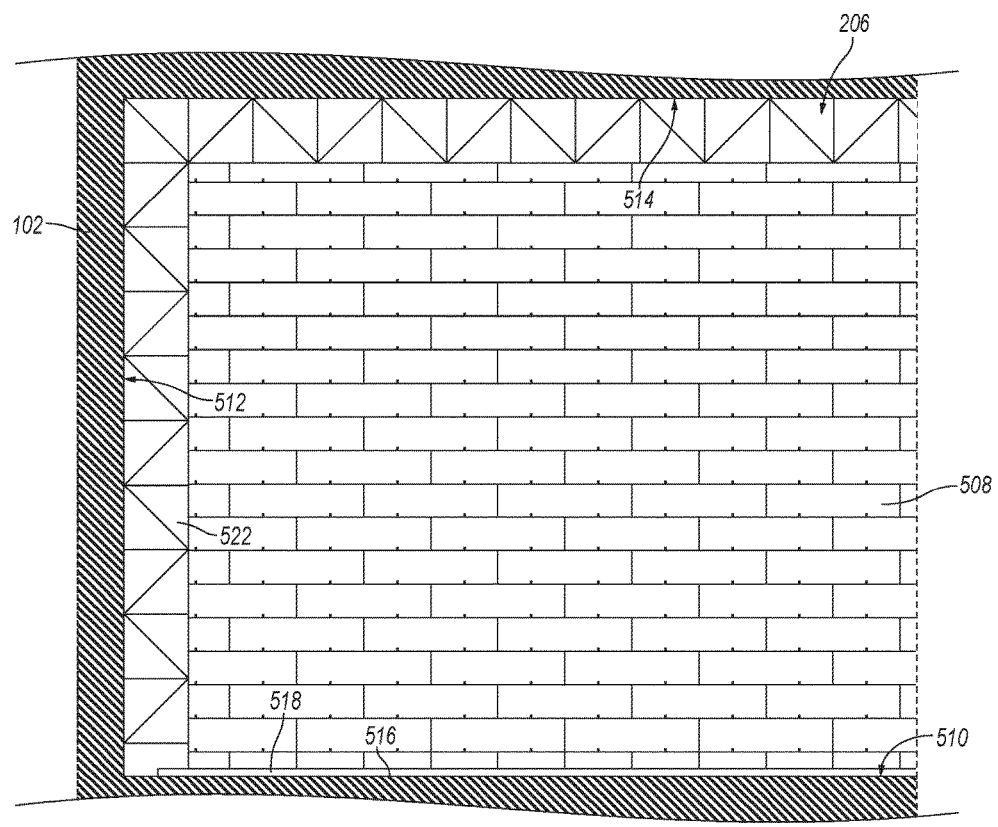
FIGS. 15 and 16 are, respectively, a first side profile view and an opposite second side profile view approximately corresponding to the portion of FIG. 3 shown in FIG. 14.
Figure 16:
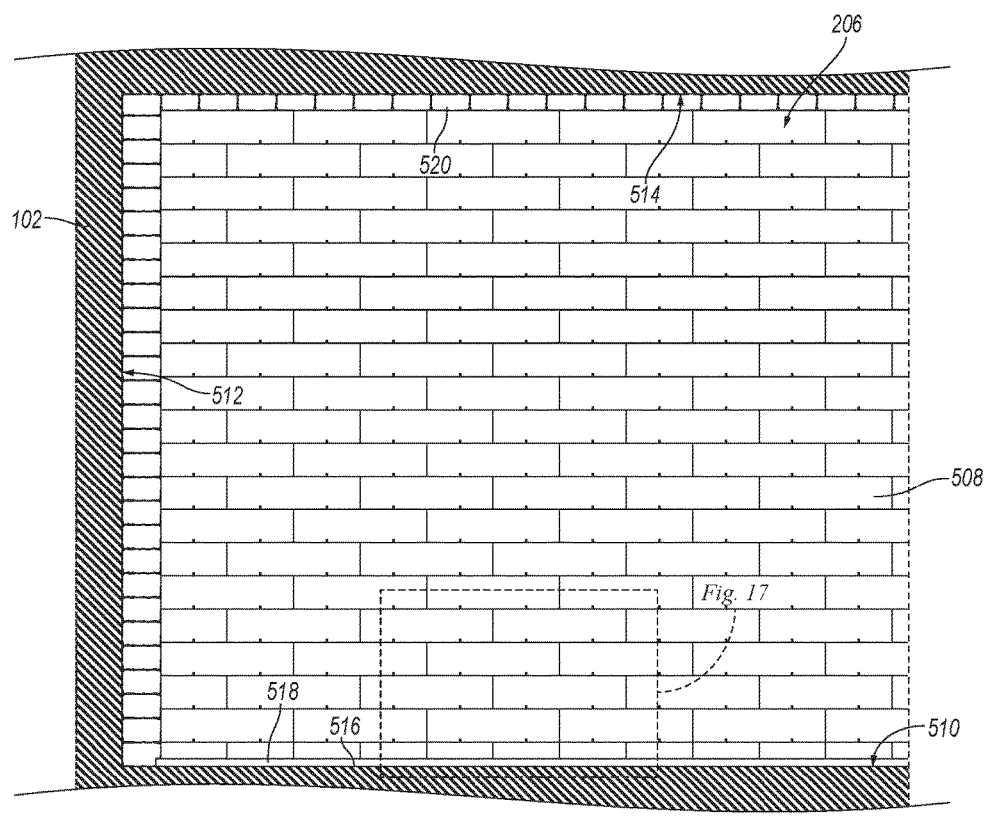

FIG. 14 is an enlarged view of a portion of FIG. 3. FIGS. 15 and 16 are, respectively, a first side profile view and an opposite second side profile view corresponding to the portion of FIG. 3 shown in FIG. 14. With reference to FIGS. 3 and 13-16 together, the illustrated portion of the compartmentalizing assembly 206 can include reusable wall components 508 of the first and second types 500, 502 removably disposed within the oversized room 114. For example, the oversized room 114 can have a finished floor surface 510 over which the wall components 508 are removably disposed, a finished wall surface 512 beside which the wall components 508 are removably disposed, and a finished ceiling surface 514 below which the wall components 508 are removably disposed. The compartmentalizing assembly 206 can include a liner 516 disposed (e.g., removably or permanently disposed) on the finished floor surface 510 below the wall components 508. For example, the liner 516 can be adhesively connected to the finished floor surface 510. The liner 516 can be useful, for example, to protect the finished floor surface 510 from other components of the compartmentalizing assembly 206, to facilitate layout the compartmentalizing assembly 206, to reduce or eliminate the possibility of shifting of the compartmentalizing assembly 206, and/or for other suitable purposes. Suitable materials for the liner 516 include strips of peel-and-stick house wrap and strips of peel-and-stick roof underlayment. The liner 516 can be disposable or reusable.

In at least some embodiments, the compartmentalizing assembly 206 includes additional components that facilitate compatibility between the wall components 508 and the oversized room 114 when the wall components 508 have standard dimensions and the oversized room 114 has irregular dimensions. For example, the compartmentalizing assembly 206 can include a mass of self-leveling material 518 (e.g., a disposable mass of hardened self-leveling grout) under the wall components 508 and over the liner 516. The mass of self-leveling material 518 can be molded and, in at least some cases, is integrally formed along most or all of an overall footprint of the compartmentalizing assembly 206. During formation of the mass of self-leveling material 518, the constituent self-leveling material can be of sufficiently low viscosity to level itself by gravity. Thus, the mass of self-leveling material 518 can automatically conform to slopes, dips, and other irregularities in the finished floor surface 510. When at least partially cured, the mass of self-leveling material 518 can provide the compartmentalizing assembly 206 with a reliably level surface that facilitates vertical stacking of the wall components 508.

As shown in FIGS. 14 and 16, the compartmentalizing assembly 206 can include compressible batting 520 disposed (e.g., stuffed) into a vertical gap between the wall components 508 and the finished wall surface 512 and disposed (e.g., stuffed) into a horizontal gap between the wall components 508 and the finished ceiling surface 514. In at least some embodiments, the batting 520 is reusable. Furthermore, the batting 520 can be non-combustible. For example, the batting 520 can be reusable bundles of lined or unlined mineral wool insulation. At a side of the compartmentalizing assembly 206 closest to the first compartment 208, the compartmentalizing assembly 206 can include molding panels 522 that hide the batting 520. The molding panels 522 can be attached to the wall components 508 magnetically, adhesively, mechanically, or in another suitable manner. In some embodiments, the overall compartmentalizing assembly 206 is self-supporting, free-standing, and has a fire rating of at least two hours. In other embodiments, the overall compartmentalizing assembly 206 can have only some or none of these attributes.

Figure 17:
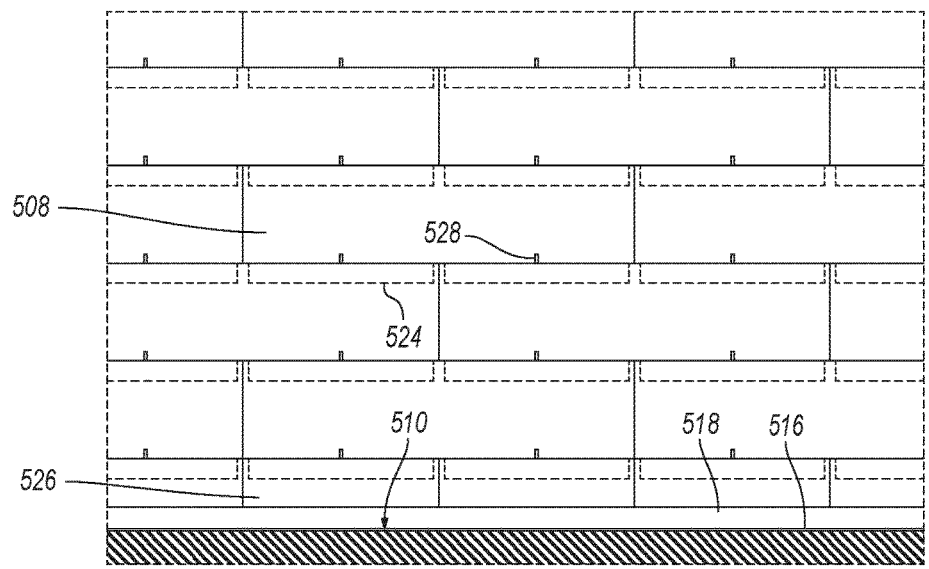
FIG. 17 is an enlarged view of a portion of FIG. 16.

FIG. 17 is an enlarged view of a portion of FIG. 16. As shown in FIG. 17, the wall components 508 can be stacked within the compartmentalizing assembly 206. Furthermore, the wall components 508 can be interlocking within the compartmentalizing assembly 206. For example, the individual wall components 508 can include downwardly extending flanges 524 that are received within successively lower wall components 508. At the mass of self-leveling material 518, the compartmentalizing assembly 206 can include base blocks 526 configured to receive the flanges 524 of the wall components 508 within a lowest row of wall components 508 within the compartmentalizing assembly 206. When fully assembled, the compartmentalizing assembly 206 can be strong enough to support fixtures and accessories (e.g., electrical conduits, monitors, shelving, moldings, artwork, furniture supports, etc.). In at least some embodiments, exposed portions of the wall components 508 are at least partially made of ferrous metal such that suitable fixtures and accessories can be connected to the compartmentalizing assembly 206 magnetically. In addition or alternatively, the wall components 508 can include coupling components 528 that allow suitable fixtures and accessories to be connected to the compartmentalizing assembly 206 mechanically and/or by gravity.

Figure 18:
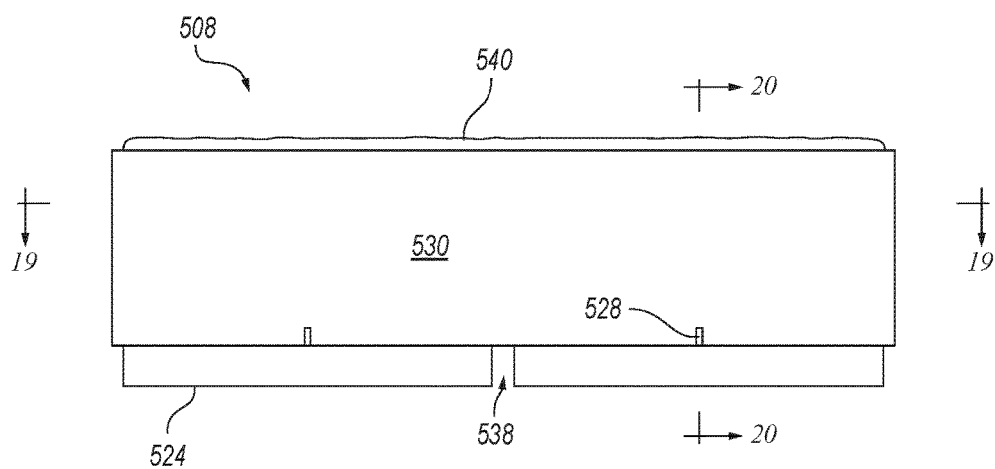
FIG. 18 is side profile view of a wall component of the compartmentalizing assembly of the collection shown in FIG. 3.

FIG. 18 is side profile view of a given one of the wall components 508 of the first type 500 separate from other portions of the compartmentalizing assembly 206. FIG. 19 is a cross-sectional top plan view of the given wall component 508 taken along the line 19-19 in FIG. 18. FIG. 20 is a cross-sectional end plan view of the given wall component 508 taken along the line 20-20 in FIG. 18. In at least some embodiments, other (e.g., most or all) of the wall components 508 of the first type 500 within the compartmentalizing assembly 206 at least substantially match the given wall component 508 illustrated in FIGS. 18-20. With reference to FIGS. 18-20 together, the given wall component 508 can include a first side panel 530 and an opposite second side panel 532 parallel to and spaced apart from the first side panel 530. Similarly, the given wall component 508 can include a first end panel 534 and an opposite second end panel 536 parallel to and spaced apart from the first end panel 534. The first and second side panels 530, 532 and the first and second end panels 534, 536 can define an interior region of the given wall component 508 shaped, for example, as a rectangular solid. The given wall component 508 can include two of the flanges 524 at the first side panel 530 and other two of the flanges 524 at the second side panel 532. As shown in FIG. 18, the flanges 524 can be parallel to and inset relative to the corresponding first and second side panels 530, 532. Between the flanges 524 at the first side panel 530 and between the flanges 524 at the second side panel 532, the given wall component 508 can include respective slots 538.

When the given wall component 508 is assembled with other wall components 508 of the first type 500 within the compartmentalizing assembly 206, one of the flanges 524 at the first side panel 530 and an opposing one of the flanges 524 at the second side panel 532 can be received within the interior region of a first neighboring lower wall component 508. Similarly, the other of the flanges 524 at the first side panel 530 and the other of the flanges 524 at the second side panel 532 can be received within the interior region of a second neighboring lower wall component 508 adjacent to the first neighboring lower wall component 508. The second end panel 536 of the first neighboring lower wall component 508 and the first end panel 534 of the second neighboring lower wall component 508 can be directly adjacent to one another and received within the slots 538 of the given wall component 508. This interaction between the wall components 508 can facilitate convenient assembly of the compartmentalizing assembly 206 with neighboring rows of the wall components 508 evenly staggered.

In at least some embodiments, the given wall component 508 is rigid and the first and second side panels 530, 532 and the first and second end panels 534, 536 provide the given wall component 508 with most of its rigidity. In the illustrated embodiment, the first and second side panels 530, 532 are thinner than the first and second end panels 534, 536 and made of a different material. For example, the first and second side panels 530, 532 can be metal (e.g., iron) and the first and second end panels 534, 536 can be cementitious (e.g., fiber-reinforced cement). The metal composition of the first and second side panels 530, 532 can be useful, for example, for aesthetics, to facilitate magnetic coupling of fixtures and accessories to the compartmentalizing assembly 206, and/or for another reason. The cementitious composition of the first and second end panels 534, 536 can be useful, for example, to enhance the fire rating of the compartmentalizing assembly 206, to reduce noise transmission through the compartmentalizing assembly 206, and/or for another reason. In other embodiments, the first and second side panels 530, 532 and the first and second end panels 534, 536 can have other suitable forms and/or compositions.

The given wall component 508 can further include compressible batting 540 disposed within its interior region. Similar to the batting 520 described above, the batting 540 can be reusable and/or non-combustible. For example, the batting 538 can be reusable bundles of lined or unlined mineral wool insulation. In at least some embodiments, the batting 540 is removable. Furthermore, the first and second side panels 530, 532 and the first and second end panels 534, 536 can be collapsible. For example, at the corners where the first and second side panels 530, 532 and the first and second end panels 534, 536 meet, the given wall component 508 can include hinges (not shown), such as flexure bearings or piano hinges that allow each corner to fold in a direction that causes the first and second side panels 530, 532 and the first and second end panels 534, 536 to flatten. This feature along with the compressibility of the batting 540 can facilitate efficient storage and transport of the given wall component 508 between deployments. When the first and second side panels 530, 532 and the first and second end panels 534, 536 are collapsible, the given wall component 508 can include a rectangular inset (not shown) that rests on upper edges of the flanges 524. The inset can be removably disposed within the interior of the given wall component 508 to cause the given wall component 508 to maintain its rectangular form during use. When the first and second side panels 530, 532 and the first and second end panels 534, 536 are to be collapsed, the inset can be removed.

FIG. 21 is an enlarged view of a portion of FIG. 20. As shown in FIG. 21, a lowermost portion of the first side panel 530 can overlap an uppermost portion of one the flanges 524. FIG. 21 further illustrates a given one of the coupling components 528 at the lowermost portion of the first side panel 530. In at least some embodiments, other (e.g., most or all) of the coupling components 528 of wall components 508 within the compartmentalizing assembly 206 at least substantially match the coupling component 528 illustrated in FIG. 21. The coupling component 528 can include a notch 542 and a plug 544 removably disposed within the notch 542. The plug 544 can include a magnet 546 that releasably connects the plug 544 to the uppermost portion of the adjacent flange 524. The plug 544 can be disposed within the notch 542 when the coupling component 528 is not in use. Removing the plug 544 from the notch 542 can expose an opening into the interior of the given wall component 508. A suitable mechanical fastener (e.g., a hook) (not shown) can be inserted into this opening. In this way, relatively heavy fixtures and accessories can be connected to the compartmentalizing assembly 206 through a reliable mechanical connection in addition to or instead of a magnetic connection.

Figure 22:
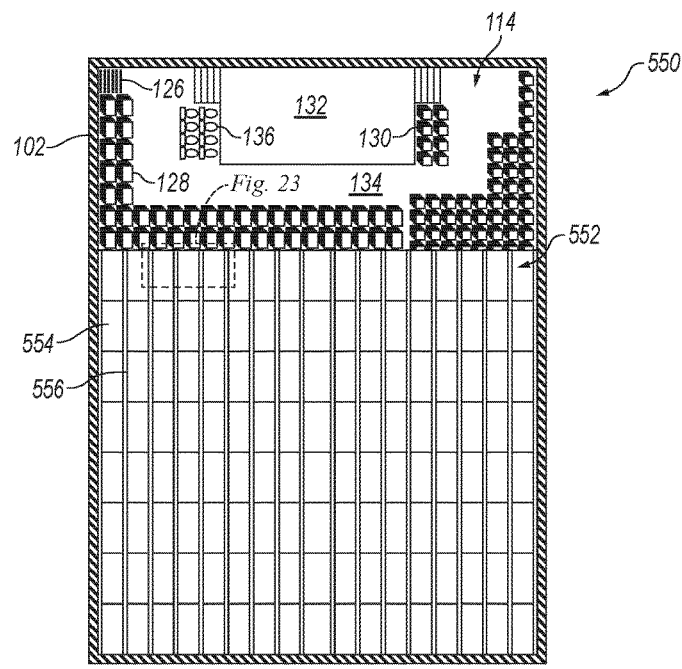
FIG. 22 is a top plan view of a portion of a collection of rentable units and associated structures in accordance with another embodiment of the present technology at the school building shown in FIG. 1 in the second state taken along the line 22-22 in FIG. 1.
Figure 23:
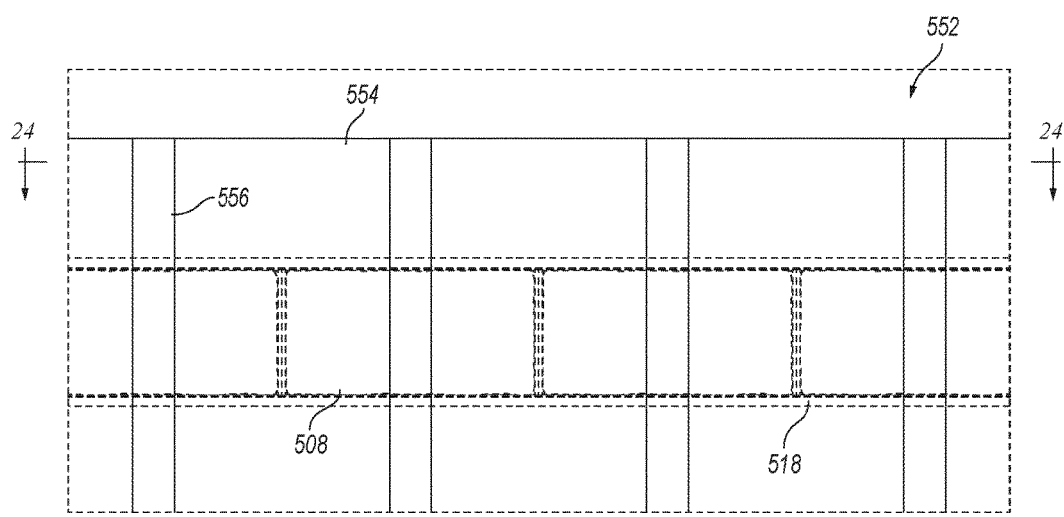
FIG. 23 is an enlarged view of a portion of FIG. 22.
Figure 24:
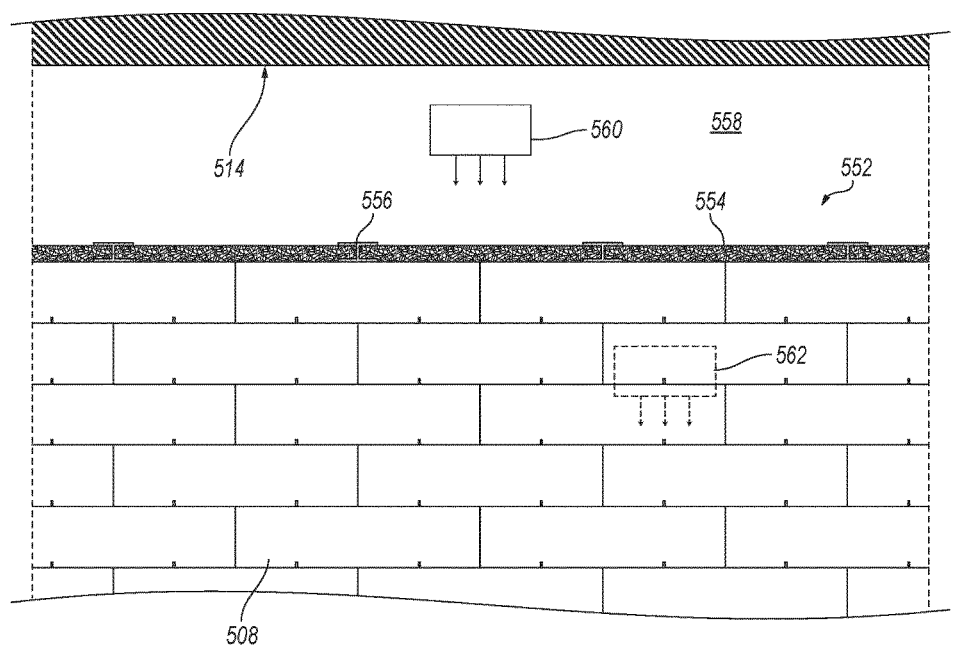
FIG. 24 is a side profile view approximately corresponding to the portion of FIG. 22 shown in FIG. 23 taken along the line 24-24 in FIG. 23.

FIG. 22 is a top plan view of a portion of a collection of rentable units and associated structures 550 in accordance with another embodiment of the present technology at the oversized room 114 of the school building 100 in the second state taken along the line 22-22 in FIG. 1. FIG. 23 is an enlarged view of a portion of FIG. 22. FIG. 24 is a side profile view approximately corresponding to the portion of FIG. 22 shown in FIG. 23 taken along the line 24-24 in FIG. 23. With reference to FIGS. 22-24 together, the collection 550 can include a compartmentalizing assembly 552 having ceiling components (e.g., reusable ceiling components) removably disposed within the oversized room 114 above the first and second compartments 208, 210. For example, the compartmentalizing assembly 552 can include rigid ceiling panels 554 and elongate ceiling beams 556 interspersed between the ceiling panels 554. The ceiling beams 556 can support the ceiling panels 554, and the wall components 508 can support the ceiling beams 556. The wall components 508 can be assembled into walls, columns, or other suitable structures. For example, the compartmentalizing assembly 552 can include a wall near the open area 134 and another wall at a portion of the oversized room 114 furthest from the stage 132. The ceiling beams 556 can extend between these walls. When a distance between underlying walls does not correspond to a multiple of the length of the ceiling panels 554, and in other cases, the ceiling panels 554 and beams 556 can be cantilevered over one or both of the underlying walls.

As shown in FIG. 24, the individual ceiling beams 556 can have an I-shape transverse cross-section including two channels at opposite sides of a central web. The individual ceiling panels 554 can have side edge portions snugly received within corresponding channels of adjacent ceiling beams 556. In at least some cases, the ceiling components form a thermally conductive ceiling above the first and second compartments 208, 210 and below an airspace 558 within the oversized room 114. The school building 100 can include a heating system 560 (shown schematically) operable to heat the airspace 558 and thereby provide shared below-room-temperature baseline heating to the third and fourth rentable units 212, 214 via the thermally conductive ceiling. The third rentable unit 212 can include a supplemental heater 562 (shown schematically) operable to heat the first compartment 208 and thereby provide supplemental heating to the third rentable unit 212. Similarly, the fourth rentable unit 214 can include a supplemental heater (not shown) operable to heat the second compartment 210 and thereby provide supplemental heating to the fourth rentable unit 214. Also similarly, the heating system 560 can provide shared below-room-temperature baseline heating to the first and second rentable units 202, 204. The first and second rentable units 202, 204 can respectively include supplemental heaters (not shown) operable to heat the classrooms 108a, 108b and thereby provide supplemental heating to the first and second rentable units 202, 204.

Figure 25:
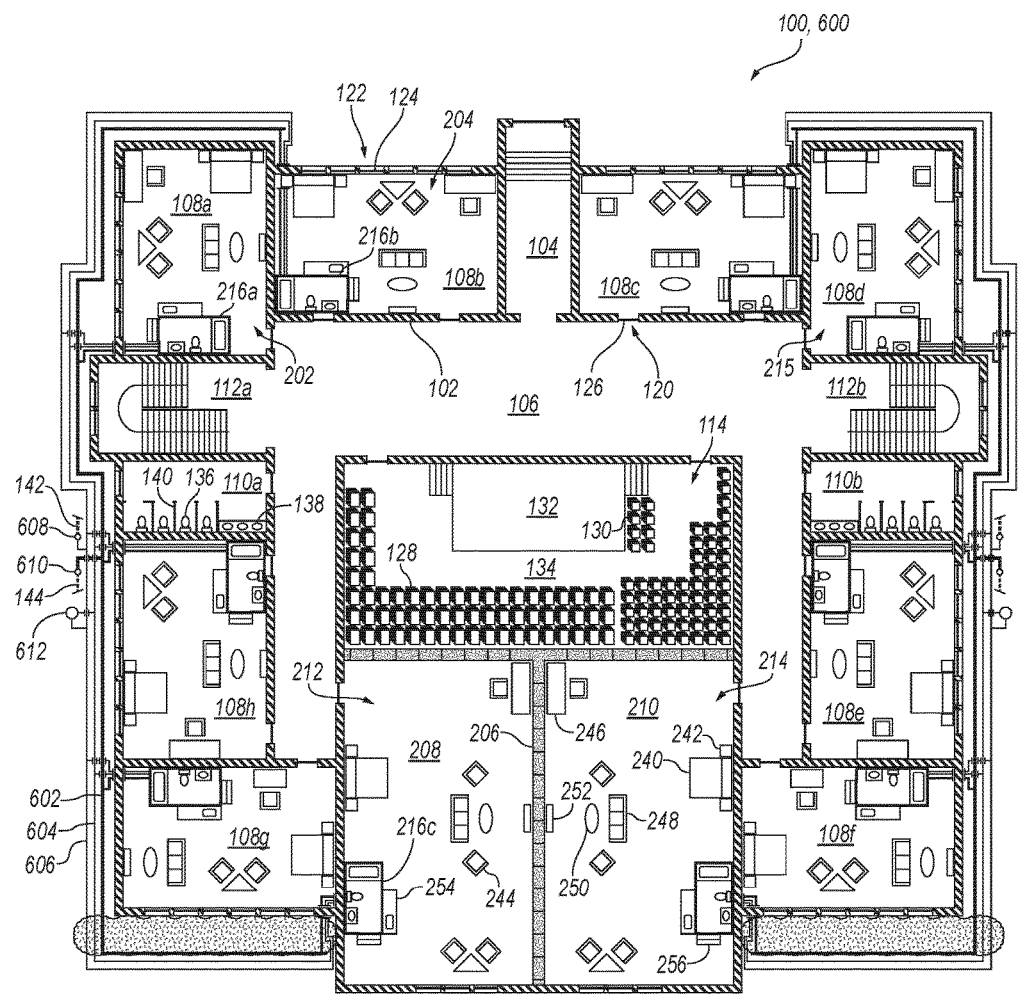
FIGS. 25 and 26 are, respectively, top plan views of collections of rentable units and associated structures in accordance with additional embodiments of the present technology at the school building shown in FIG. 1 in the second state taken along the line A-A in FIG. 1.

FIG. 25 is a top plan view of a collection of rentable units and associated structures 600 in accordance with another embodiment of the present technology at the school building 100 in the second state taken along the line A-A in FIG. 1. As shown in FIG. 25, the collection 600 can include a plumbing drain line 602, a cold water supply line 604, and a hot water supply line 606 disposed outside the school building 100. For example, the plumbing drain line 602, the cold water supply line 604, and the hot water supply line 606 can extend above-ground over a length of at least two meters outside the school building 100. In the illustrated embodiment, the plumbing drain line 602 connects the corresponding bathrooms 216 to the plumbing drain trunk line 142 via a corresponding exterior plumbing drain hookup 608 rather than through the school bathroom 110a. Similarly, the cold and hot water supply lines 604, 606 connect the corresponding bathrooms 216 to the water supply trunk line 144 via a corresponding exterior water supply hookup 610 rather than through the school bathroom 110a.

The exterior plumbing drain hookup 608 and the exterior water supply hookup 610 can be retrofitted. Furthermore, the hot water supply line 606 can be connected to the water supply trunk line 144 via a hot water reservoir 612 disposed (e.g., removably disposed) outside the school building 100 rather than within the school building 100. Locating the plumbing drain line 602, the cold water supply line 604, the hot water supply line 606, the hot water reservoir 612, and/or other suitable components of the collection 600 outside the school building 100 rather than within the school building 100 can be useful, for example, to facilitate use of the hallway 106 (or other portions of the school building 100 that would otherwise contain these components) by renters of the first, second, third, fourth, and additional rentable units 202, 204, 212, 214, 215.

In another embodiment, the first, second, third, fourth, and additional rentable units 202, 204, 212, 214, 215 are operably associated with components that reduce or eliminate the need for even temporary connections to permanent systems of the school building 100. For example, the first, second, third, fourth, and additional rentable units 202, 204, 212, 214, 215 can be operably associated with a high-capacity sewage detention reservoir (not shown) disposed (e.g., removably disposed) within or outside the school building 100, a high-capacity cold water reservoir (not shown) disposed (e.g., removably disposed) within or outside the school building 100, and/or a high-capacity generator (not shown) disposed (e.g., removably disposed) within or outside the school building 100. The high-capacity sewage detention reservoir can be configured for occasional evacuation into a mobile tanker (e.g., a septic system pump truck). Similarly, the high-capacity cold water reservoir can be configured for occasional replenishment from a mobile tanker (e.g., a water supply truck).

Figure 26:
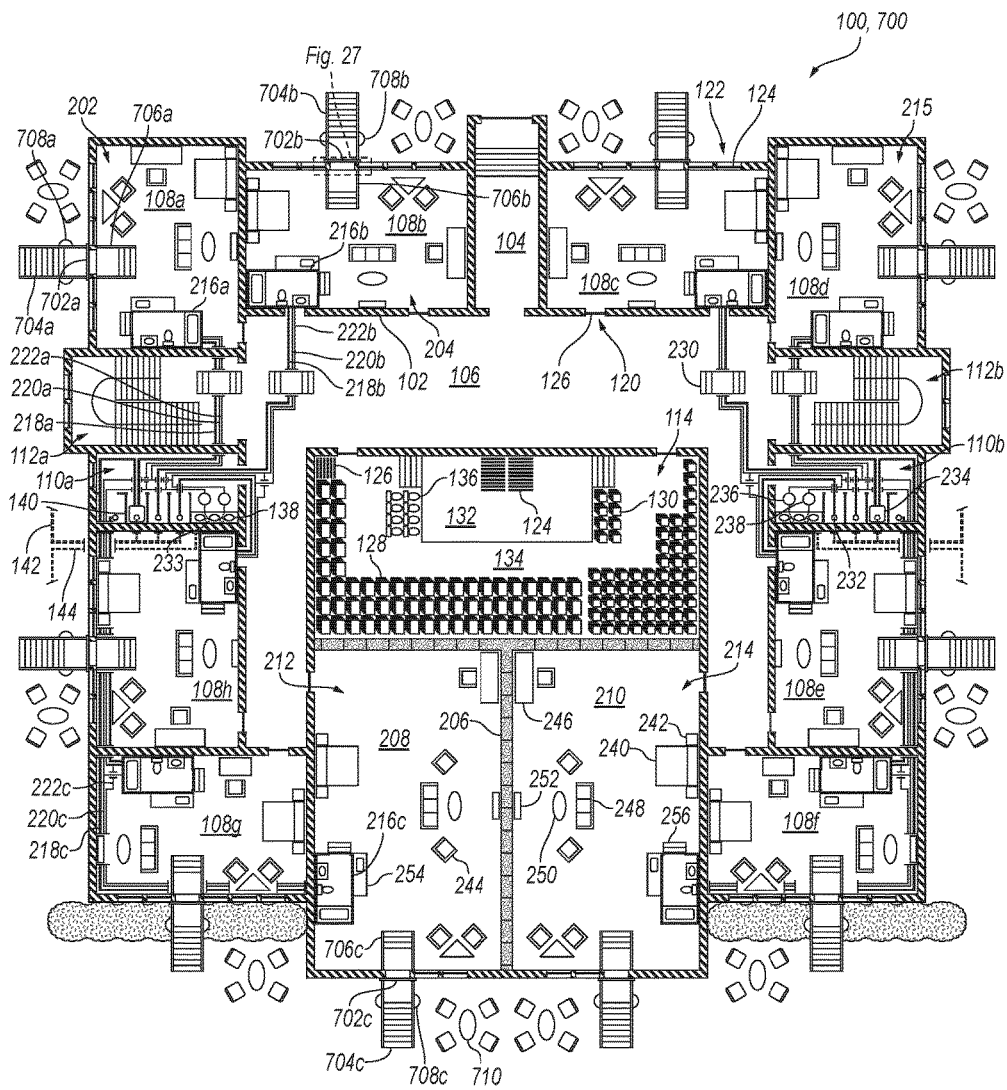

FIG. 26 is a top plan view of a collection of rentable units and associated structures 700 in accordance with another embodiment of the present technology at the school building 100 in the second state taken along the line A-A in FIG. 1. As shown in FIG. 26, the classrooms 108 and the first and second compartments 208, 210 can be directly accessible from the exterior of the school building 100. This can facilitate unmanned operation of the first, second, third, fourth, and additional rentable units 202, 204, 212, 214, 215. At least some of the window openings 122 (e.g., one window opening 122 per classroom 108, one window opening 122 of the first compartment 208, and one window opening 122 of the second compartment 210) can be retrofitted (e.g., at least substantially reversibly retrofitted) to provide direct access to the corresponding ones of the classrooms 108, the first compartment 208, and the second compartment 210 from the exterior of the school building 100. Retrofitting the window openings 122 can include removing the sashes 124 from the window openings 122. In many types of windows (e.g., double-hung windows) commonly found in school buildings, the sashes 124 are readily removable and replaceable. After removal, the sashes 124 can be temporarily stored within the oversized room 114 near the stage 132 until needed for reinstallation into the corresponding window openings 122. Thus, removal of the sashes 124 and other suitable retrofits to the window openings 122 can be readily reversible. Alternatively, some of all of these retrofits can be permanent.

Additional features of the illustrated embodiment will now be described at least primarily with regard to the first, second, and third rentable units 202, 204, 212. It should be understood that the same or similar features can be present in the fourth rentable unit 214 and the additional rentable units 215 unless the context clearly indicates otherwise. As shown in FIG. 26, the collection 700 can include doorways 702 (individually identified as doorways 702a-702c) disposed (e.g., removably disposed) in operable association with respective window openings 122 of the classrooms 108a, 108b and the first compartment 208, respectively. In the illustrated embodiment, the doorways 702 are reusable doorway overlays. This form can be useful to reduce or eliminate the need for custom sizing of the doorways 702. In other embodiments, the doorways 702 can be reusable doorway inserts, or have other suitable forms. With reference again to the illustrated embodiment, the collection 700 further includes exterior stairways 704 (individually identified as exterior stairways 704a-704c) disposed (e.g., removably disposed) in operable association with respective window openings 122 of the classrooms 108a, 108b and the first compartment 208, respectively. Similarly, in the illustrated embodiment, the collection 700 includes interior stairways 706 (individually identified as interior stairways 706a-706c) disposed (e.g., removably disposed) in operable association with respective window openings 122 of the classrooms 108a, 108b and the first compartment 208, respectively. In other embodiments, some or all of the exterior and interior stairways 704, 706 can be replaced with corresponding exterior and interior ramps.

Similar to the bathrooms 216, the exterior and interior stairways 704, 706 can be reusable. In the illustrated embodiment, the exterior and interior stairways 704, 706 are assemblies of reusable exterior and interior stairway modules configured for rapid deployment into and out of operable association with the corresponding window openings 122 in an at least partially disassembled state. For example, the exterior and interior stairways 704, 706 can be made up mostly or entirely of reusable modular components. In other embodiments, the exterior and interior stairways 704, 706 can be portable exterior and interior stairway units, such as exterior and interior stairway units configured for rapid deployment into and out of operable association with the corresponding window openings 122 without significant disassembly. This deployment and removal can occur by forklift, by dolly, by operation of wheels integrated into the exterior and interior stairways 704, 706, or in another suitable manner. In still other embodiments, the exterior and interior stairways 704, 706 can have other suitable forms. Furthermore, the collection 700 can include footings 708 (individually identified as footings 708a-708c) removably or permanently disposed outside respective window openings 122 of the classrooms 108a, 108b and the first compartment 208, respectively. The individual exterior stairways 704a-c can be removably connected to the individual footings 708a-c, respectively. The footings 708 can be permanent concrete piers or pads or have other suitable forms.

When the classrooms 108a, 108b and the first compartment 208 are directly accessible from the exterior of the school building 100, the first, second, and third rentable units 202, 204, 212 can be accessible only in this manner or both in this manner and via the hallway 106. In the former case, which is not illustrated in FIG. 26, the bathrooms 216a, 216c can be shifted to block the doorway openings 120 of the classroom 108a and the first compartment 208, respectively. In addition or alternatively, the plumbing drain lines 218a, 218c, the cold water supply lines 220a, 220c, and the hot water supply lines 222a, 222c can be routed through the doorway openings 120 of the classroom 108a and the first compartment 208, respectively, rather than through openings in the permanent walls 102. Direct access to the classrooms 108a, 108b and the first compartment 208 from the exterior of the school building 100 can facilitate use of outdoor areas nearby the classrooms 108a, 108b and the first compartment 208 by renters of the first, second, and third rentable units 202, 204, 212. Accordingly, the collection 700 can include outdoor furniture 710 removably disposed in these outdoor areas to support such use.

Figure 27:
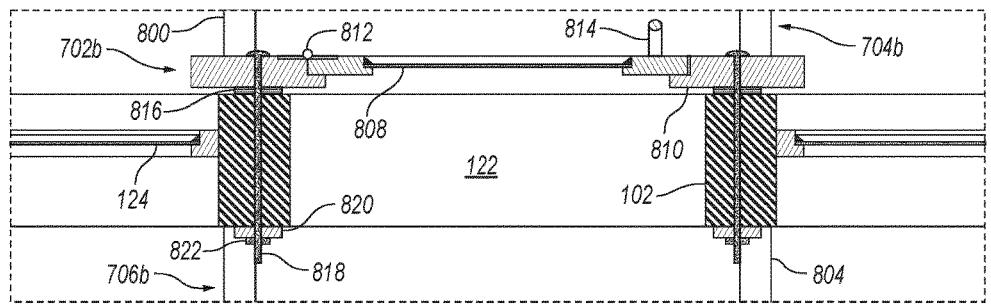
FIG. 27 is an enlarged view of a portion of FIG. 26.
Figure 28:
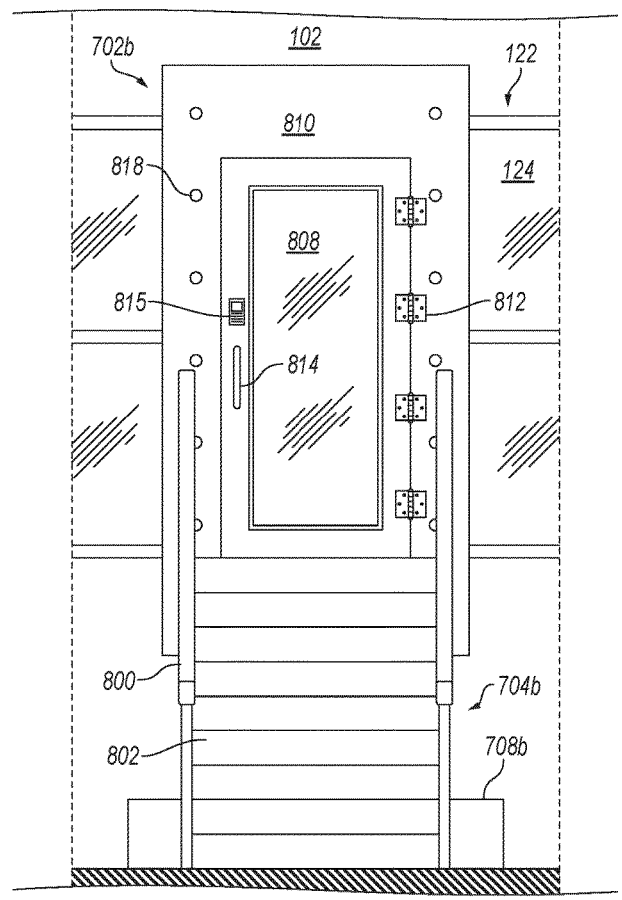
FIGS. 28 and 29 are, respectively, an exterior side profile view and an opposite interior side profile view approximately corresponding to the portion of FIG. 26 shown in FIG. 27.
Figure 29:
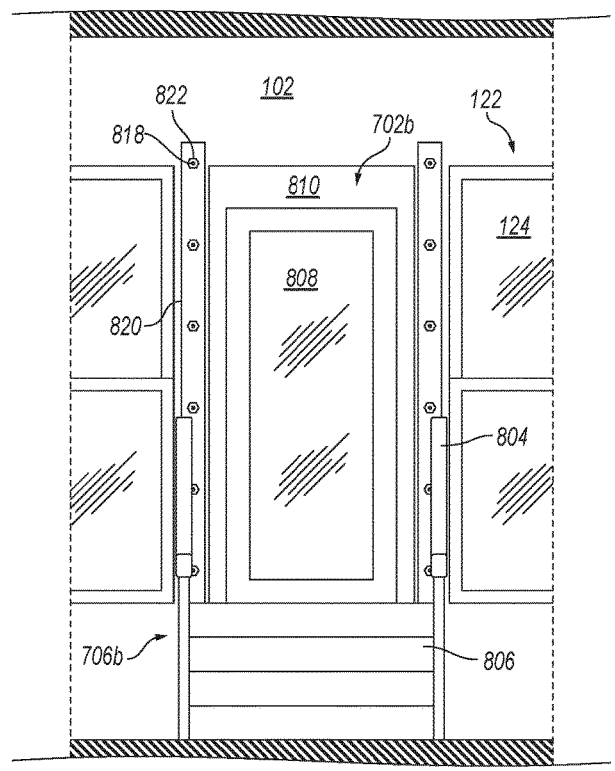

FIG. 27 is an enlarged view of a portion of FIG. 26. FIGS. 28 and 29 are, respectively, an interior side profile view and an opposite exterior side profile view approximately corresponding to the portion of FIG. 26 shown in FIG. 27. The doorway 702b, the exterior stairway 704b, the interior stairway 706b, and associated portions of the collection 700 and the school building 100 will now be described with the understanding that the doorways 702a, 702c, the exterior stairways 704a, 704c, the interior stairways 706a, 706c, and associated portions of the collection 700 and the school building 100 can have the same or similar features. With reference to FIGS. 26-29 together, the exterior stairway 704b can include exterior railings 800 and exterior steps 802 disposed between the exterior railings 800. Similarly, the interior stairway 706b can include interior railings 804 and interior steps 806 disposed between the interior railings 804. The doorway 702b can include a door 808, a frame 810, and hinges 812 operably connecting the door 808 and the frame 810 to one another. The doorway 702b can further include a handle 814 that facilitates operation of the door 808 from the exterior of the school building 100.

The doorway 702b can still further include a smart lock 815 configured to allow a renter of the second rentable unit 204 to unlock the door 808 by operation of a mobile device (e.g. a mobile phone), by entering a passcode, by providing a biometric identification (e.g., a fingerprint), or in another suitable manner. For example, the smart lock 815 may request a first identifier from the renter upon initial check-in. The first identifier can be a last name or some other identifier that is readily available to the renter, but may not be particularly secure. Correct entry of the first identifier can cause the smart lock 815 to signal (e.g., wirelessly signal) an associated server (not shown) to send a text message, email, etc. to the renter's mobile device. The number associated with the mobile device can be a number provided by the renter to an operator of the second rentable unit 204 in conjunction with reservation of the second rentable unit 204 or in conjunction with establishing or maintaining membership in a group of renters authorized to rent the second rentable unit 204 without making a reservation. The text message, email, etc. can contain a newly generated passcode that can be entered into the smart lock 815, alone or in addition to other identifiers, for subsequent access to the second rentable unit 204 by the renter. To grant access to another person, the renter merely forwards the text message, email, etc. containing the passcode to that person. When the renter's permission to use the second rentable unit 204 has expired, the smart lock 815 can discontinue granting access to the second rentable unit 204 in response to entry of the passcode. This manner of controlling access to the second rentable unit 204 can be significantly more secure, antonymous, and efficient than conventional forms of access control, such as those that rely on physical keycards.

The frame 810 can be removably connected to portions of the permanent wall 102 on either side of the corresponding window opening 122. Between the frame 810 and the permanent wall 102, the doorway 702b can include a gasket 816 that enhances the weather resistance of the connection between the frame 810 and the permanent wall 102. In the illustrated embodiment, the frame 810 is removably bolted to the permanent wall 102. For example, the doorway 702b can include bolts 818 that extend through the frame 810, through the gasket 816, and through the permanent wall 102. At an inside surface of the permanent wall 102, the doorway 702b can include furring strips 820 through which the bolts 818 also extend, and nuts 822 operably connected to the bolts 818 and bearing on the furring strips 820. In other embodiments, the doorway 702b can be connected to the permanent wall 102 in another suitable manner, such as using removable clamps. Furthermore, rather than being removably connected to the corresponding window opening 122 at an exterior side of the permanent wall 102, in other embodiments, the doorway 702b can be removably connected to the corresponding window opening 122 at an interior side of the permanent wall 102.

Figure 30:
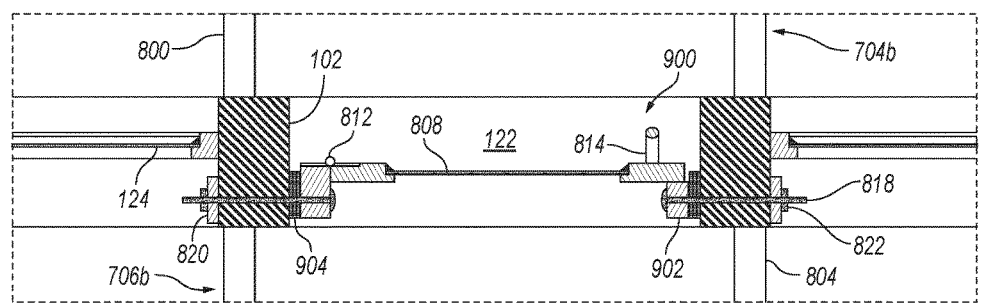
FIG. 30 is a top plan view of a doorway of a collection of rentable units and associated structures in accordance with another embodiment of the present technology at the school building shown in FIG. 1 in the second state taken along the line A-A in FIG. 1 and corresponding to the portion shown in FIG. 27.

FIG. 30 is a top plan view of a doorway 900 of a collection of rentable units and associated structures in accordance with another embodiment of the present technology at the school building 100 in the second state taken along the line A-A in FIG. 1 and corresponding to the portion shown in FIG. 26. In contrast to the doorway 702b shown in FIGS. 26-29, the doorway 900 is an inset rather than an overlay. For example, the doorway 900 can be disposed within the corresponding window opening 122 rather than at an exterior or interior side of the corresponding window opening 122. As shown in FIG. 30, the doorway 900 can include a frame 902 that is narrower than the corresponding window opening 122. The doorway 900 can further include gaskets 904 disposed between the frame 902 and sidewalls of the corresponding window opening 122. The bolts 818 of the doorway 900 can extend laterally through respective portions of the permanent wall 102 on opposite sides of the corresponding window opening 122 in which the doorway 900 is installed. For example, the bolts 818 can extend into respective neighboring window openings 122 in which the corresponding furring strips 820 and nuts 822 are located. The gaskets 904 can be layered to compensate for a difference between a width of the frame 902 and a width of the corresponding window opening 122, such as when the doorway 900 is a standard size and the corresponding window opening 122 is a non-standard size. Although not adaptable to as wide a range of window opening widths as the doorway 702b described above, the doorway 900 may be preferred over the doorway 702b in some cases for aesthetic or other reasons.

Figure 31:
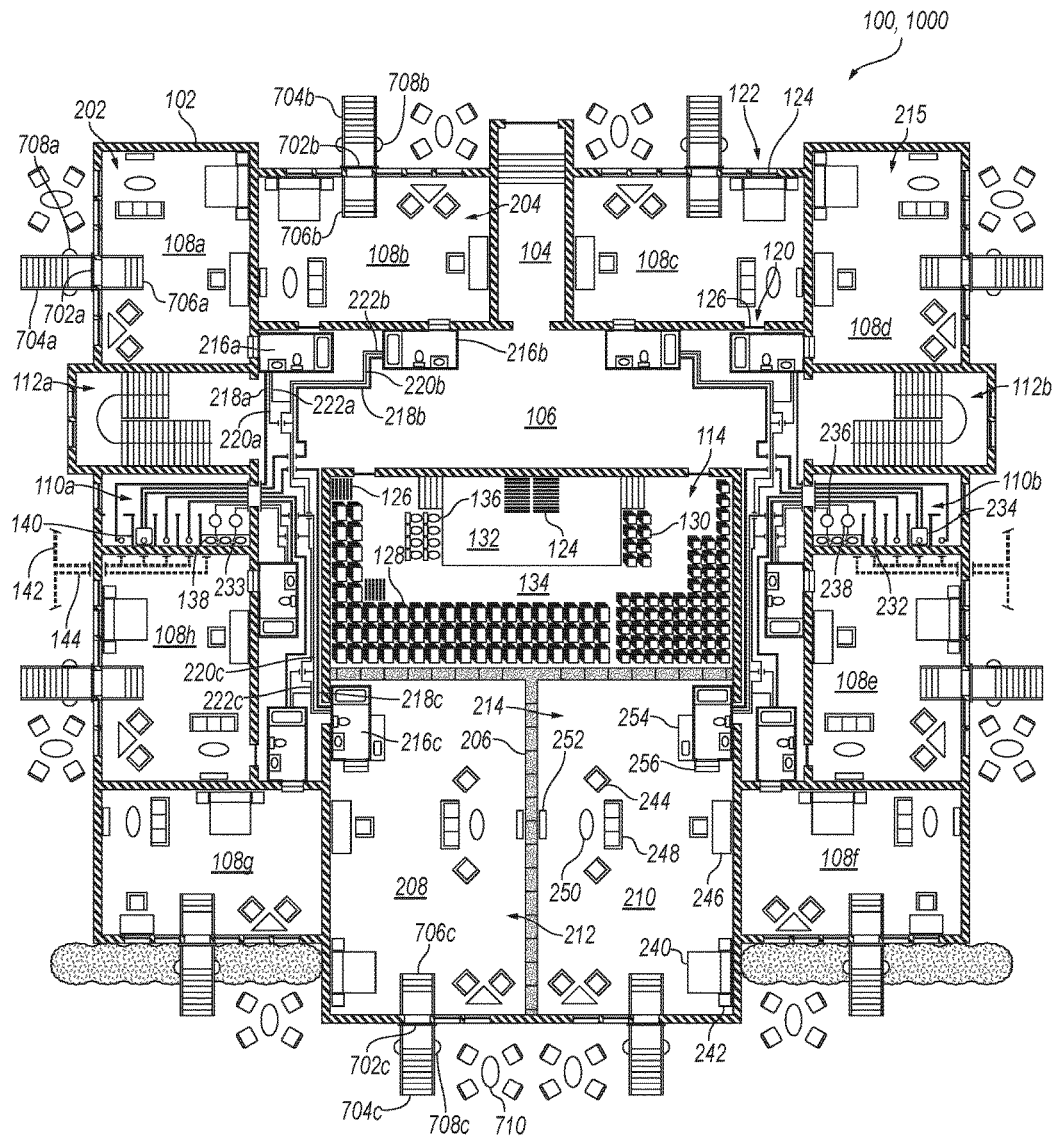
FIGS. 31-35 are, respectively, top plan views of collections of rentable units and associated structures in accordance with additional embodiments of the present technology at the school building shown in FIG. 1 in the second state taken along the line A-A in FIG. 1.

FIG. 31 is a top plan view of a collection of rentable units and associated structures 1000 in accordance with another embodiment of the present technology at the school building 100 in the second state taken along the line A-A in FIG. 1. As shown in FIG. 31, the bathrooms 216a, 216b can be accessible from the classrooms 108a, 108b via the respective doorway openings 120 of the classrooms 108a, 108b. For example, the bathrooms 216a, 216b can be disposed (e.g., removably disposed) within the hallway 106 adjacent to the respective doorway openings 120 of the classrooms 108a, 108b. Furthermore, the respective doorway opening 320 of the bathrooms 216a, 216b can be aligned with the respective doorway openings 120 of the classrooms 108a, 108b. In at least some embodiments, the bathrooms 216a, 216b block access to the classrooms 108a, 108b from the main entrance 104 via the hallway 106. Similar to the embodiment illustrated in FIG. 26, the plumbing drain lines 218a, 218b, the cold water supply lines 220a, 220b, and the hot water supply lines 222a, 222b can be routed through the hallway 106 with no need or at least little need for retrofitted openings in the permanent walls 102. In the illustrated embodiment, the bathroom 216c is removably disposed within the first compartment 208. In other embodiments, the bathroom 216c can be removably disposed within the hallway 106 (e.g., adjacent to the oversized room 114) and/or have some or all of the other features described for the bathrooms 216a, 216b in the context of the collection 1000.

Figure 32:
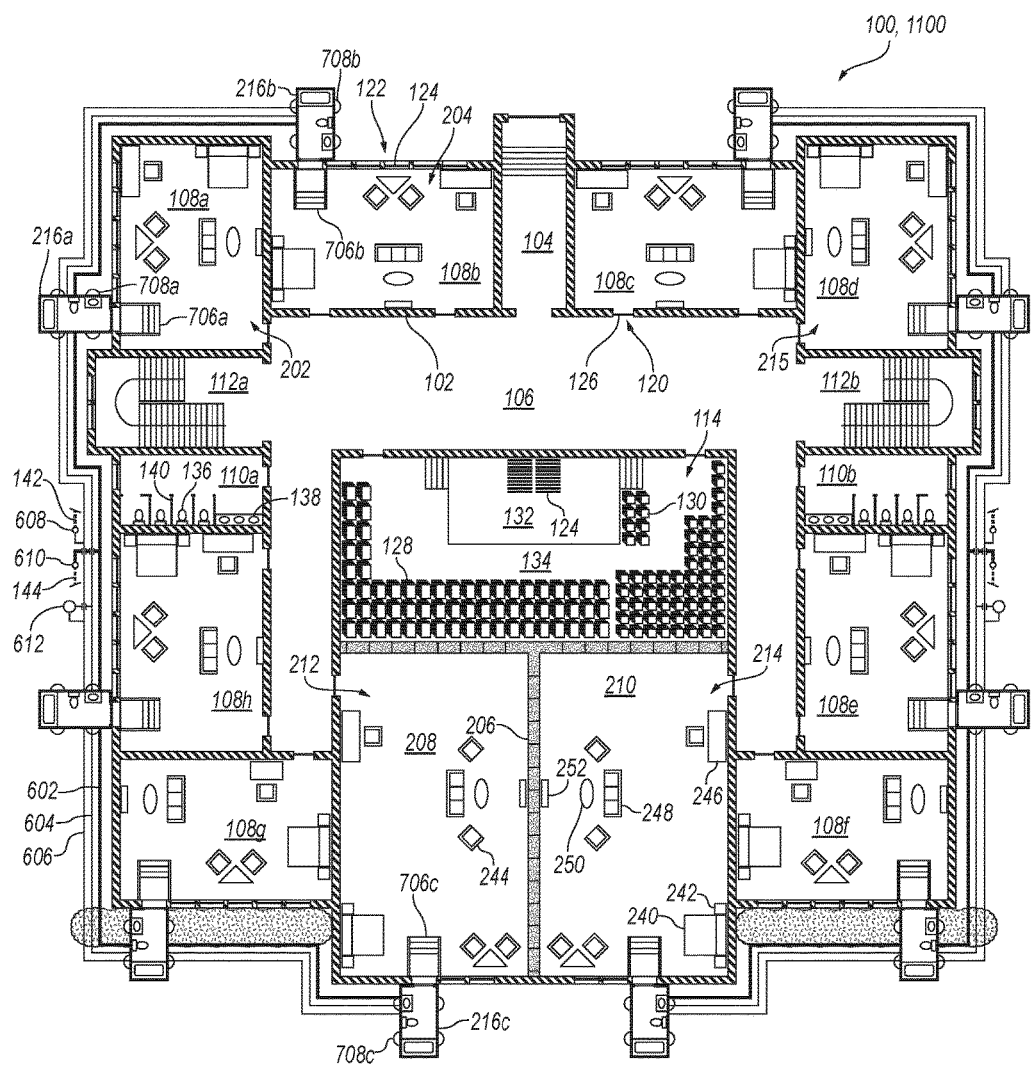

FIG. 32 is a top plan view of a collection of rentable units and associated structures 1100 in accordance with another embodiment of the present technology at the school building 100 in the second state taken along the line A-A in FIG. 1. As shown in FIG. 32, the bathrooms 216a-216c can be disposed (e.g., removably disposed) outside the classrooms 108a, 108b and the oversized room 114, respectively. For example, the bathrooms 216a-216c can be removably disposed outside and adjacent to respective window openings 122 of the classrooms 108a, 108b and the oversized room 114, respectively. The bathrooms 216a-216c can be accessible from the classrooms 108a, 108b and the oversized room 114, respectively, via the corresponding window openings 122 of the classrooms 108a, 108b and the oversized room 114. Furthermore, the respective doorway openings 320 of the bathrooms 216a-216c can be aligned with the corresponding window openings 122 of the classrooms 108a, 108b and the oversized room 114. In at least some embodiments, the bathrooms 216a-216c are removably connected to the footings 708a-708c, respectively, which can have the same or similar features in the context of the illustrated embodiment as described above in the context of the embodiment illustrated in FIG. 26. The plumbing drain line 602, the cold water supply line 604, and the hot water supply line 606 can extend under the bathrooms 216a-216c.

Figure 33:
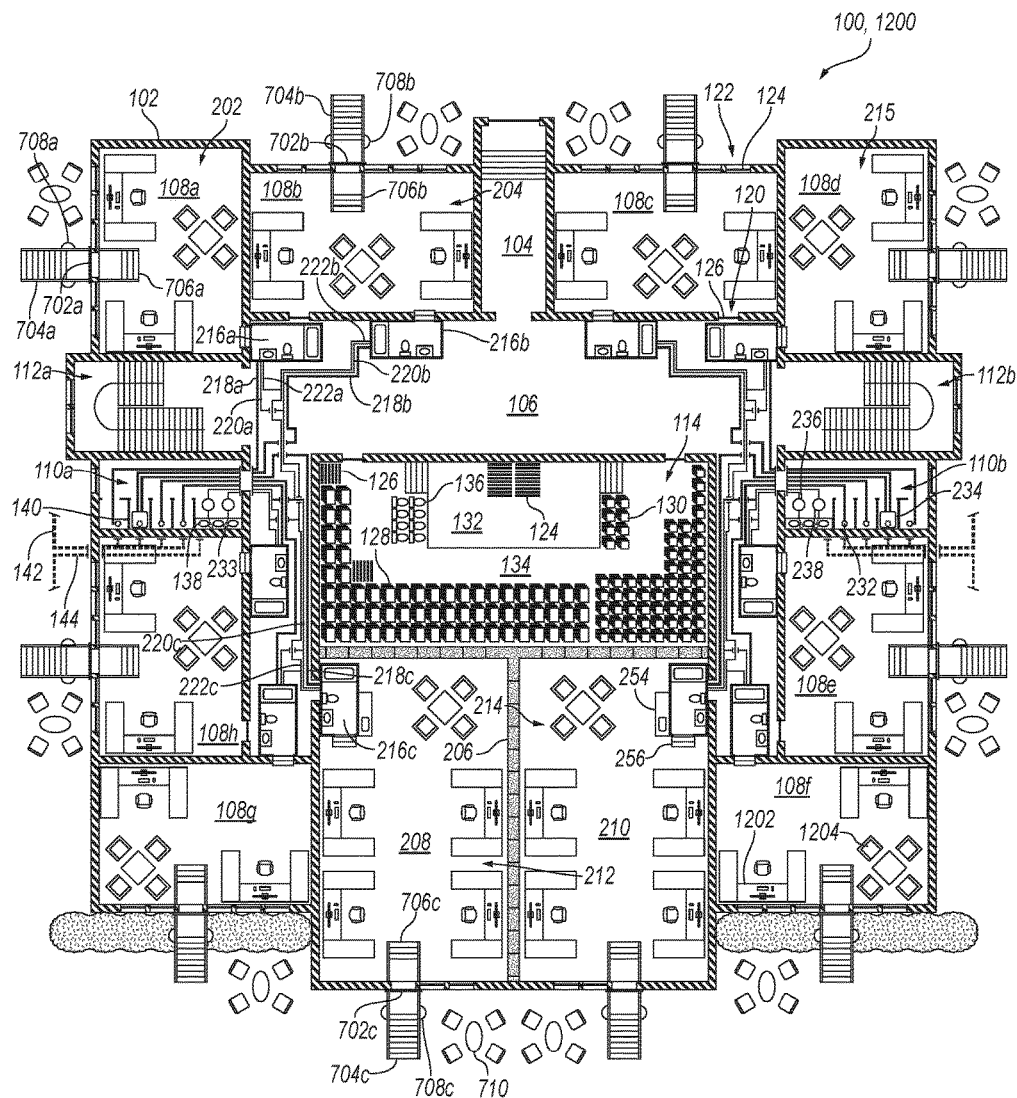
Figure 34:
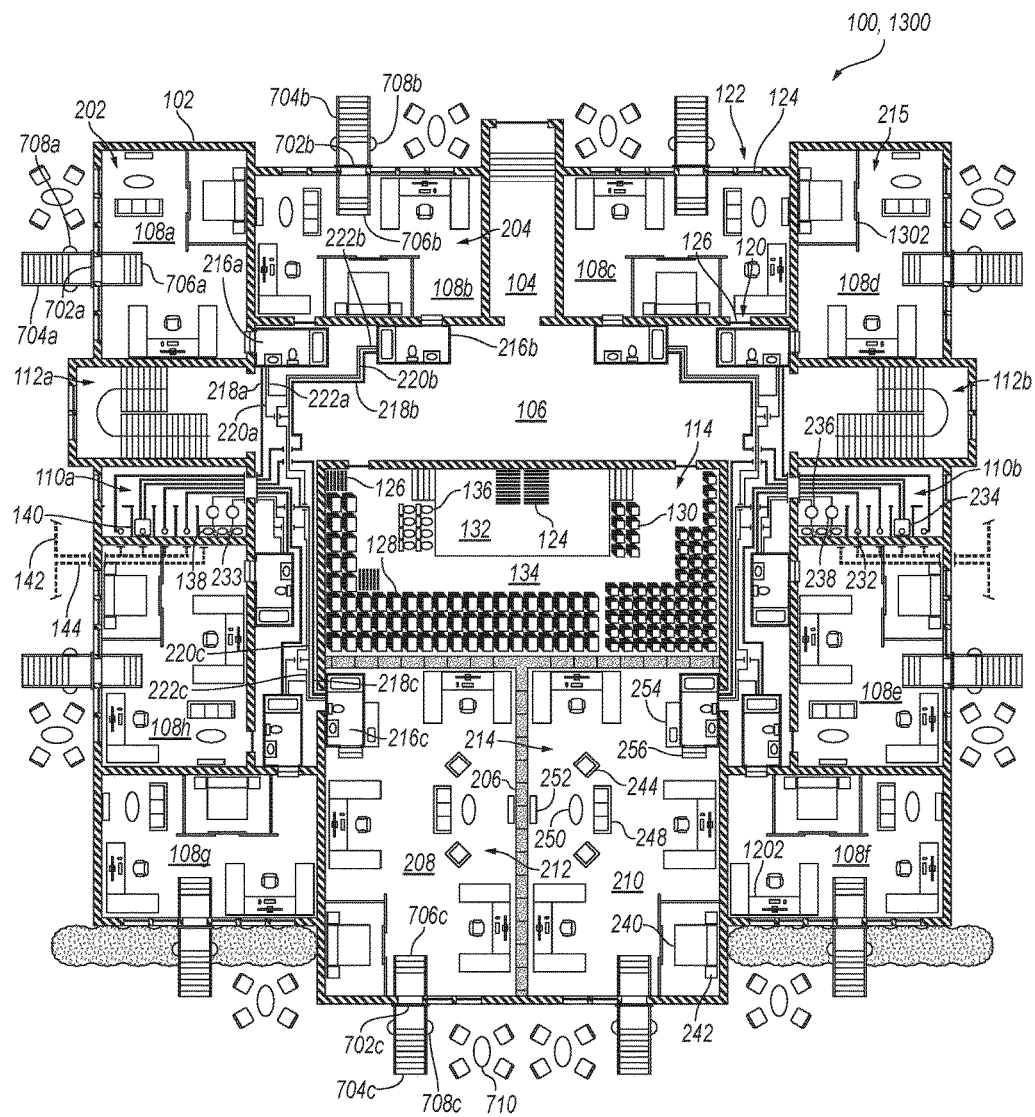
Figure 35:
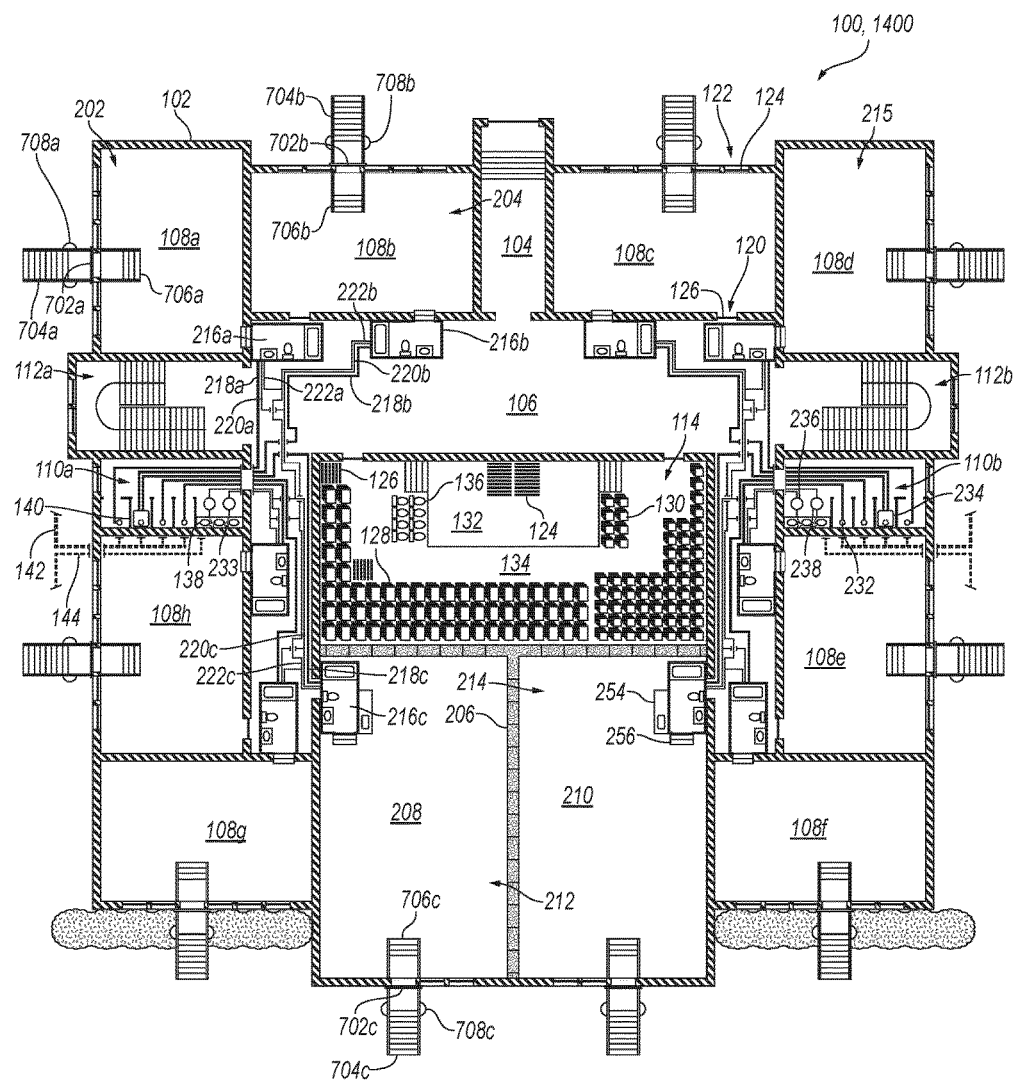

In the embodiments illustrated in FIGS. 3, 25, 26, 31 and 32, the first, second, and third rentable units 202, 204, 212 are configured at least primarily as lodging units. In other embodiments, the first, second, and third rentable units 202, 204, 212 can have other suitable primary uses. For example, the first, second, and third rentable units 202, 204, 212 can be rentable residential units for which the furnishings and fixtures illustrated in FIGS. 3, 25, 26, 31 and 32 may be well suited. In addition or alternatively, the first, second, and third rentable units 202, 204, 212 can be rentable office units, rentable assembly units, and/or rentable units of another suitable type. For example, FIGS. 33-35 are top plan view of respective collections of rentable units and associated structures 1200, 1300, 1400 in accordance with additional embodiments of the present technology at the school building 100 in the second state taken along the line A-A in FIG. 1. In the embodiment illustrated in FIG. 33, the first, second, and third rentable units 202, 204, 212 are respective rentable office units. For example, the collection 1200 can include workstations 1202 and meeting stations 1204 removably disposed within the classrooms 108a, 108b and the first compartment 208. In the embodiment illustrated in FIG. 34, the first, second, and third rentable units 202, 204, 212 are respective combined lodging and rentable office units. For example, the collection 1300 can include partitions 1302 that close off the beds 240 during work hours. In the embodiment illustrated in FIG. 35, the first, second, and third rentable units 202, 204, 212 are respective assembly units. Numerous other suitable uses and configurations of the first, second, and third rentable units 202, 204, 212 in accordance with embodiments of the present technology are also possible.

Figures 36, 37:
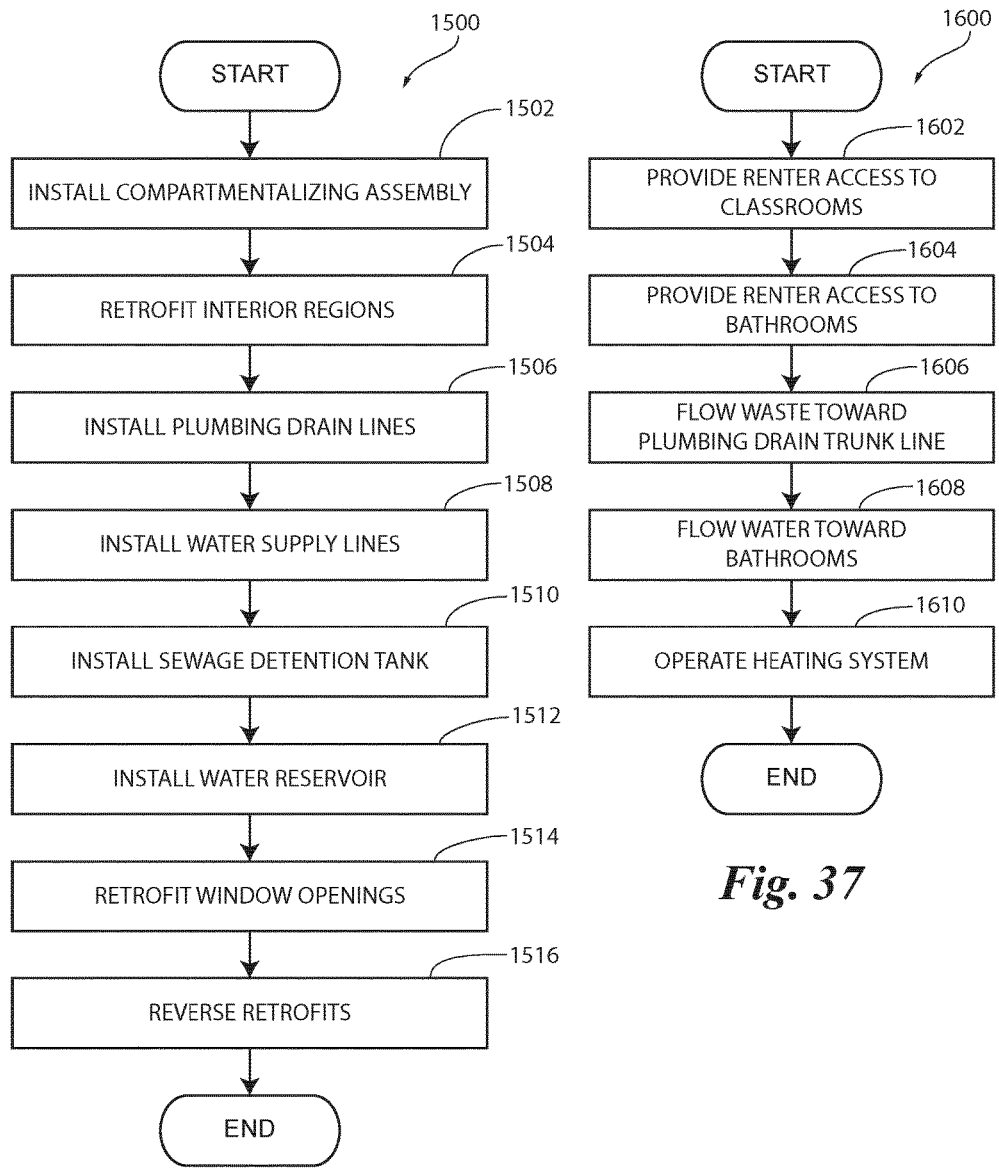
FIG. 36 is a block diagram illustrating a method for making a collection of rentable units and associated structures in accordance with an embodiment of the present technology.
FIG. 37 is a block diagram illustrating a method for operating a collection of rentable units and associated structures in accordance with an embodiment of the present technology.

FIG. 36 is a block diagram illustrating a method 1500 for making a given collection of rentable units and associated structures in accordance with an embodiment of the present technology. It should be understood that the method 1500, when suitable, and/or portions of the method 1500, when suitable, can be practiced with respect to any of the collections 200, 550, 600, 700, 1000, 1100, 1200, 1300, 1400 described above with reference to FIGS. 3-35 as well as with respect to other collections in accordance with embodiments of the present technology. With reference to FIGS. 3-36 together, the method 1500 can include removably disposing the compartmentalizing assembly 206 within the oversized room 114 (block 1502). Removably disposing the compartmentalizing assembly 206 can include removably disposing the wall components 508 within the oversized room 114, such as over the finished floor surface 510 of the oversized room 114. Removably disposing the wall components 508 can including stacking and/or interlocking the wall components 508. Furthermore, removably disposing the compartmentalizing assembly 206 can include disposing (e.g., removably disposing) the liner 516 over the finished floor surface 510. For example, removably disposing the compartmentalizing assembly 206 can include adhesively connecting the liner 516 to the finished floor surface 510. In addition or alternatively, removably disposing the compartmentalizing assembly 206 can include forming the mass of self-leveling material 518 within the oversized room 114, such as integrally along most or all of an overall footprint of the compartmentalizing assembly 206.

In a particular example, forming the mass of self-leveling material 518 includes disposing a low-viscosity material into a form. The form can be made in situ, such as by disposing a bead of polyurethane foam around an intended perimeter of a footprint of the compartmentalizing assembly 206, or in another suitable manner. After being disposed within the form, the mass of self-leveling material 518 can be allowed to self-level by gravity with or without vibration or other processes to expedite the self-leveling process. The mass of self-leveling material 518 can then be at least partially solidified. Forming the mass of self-leveling material 518 can occur over the liner 516. After the mass of self-leveling material 518 has at least partially solidified, the wall components 508 can be removably disposed over the mass of self-leveling material 518. Removably disposing the compartmentalizing assembly 206 can also include removably disposing the ceiling panels 554, the ceiling beams 556, and/or other suitable ceiling components within the oversized room 114, such as above the first and second compartments 208, 210. In this or another suitable manner, removably disposing the compartmentalizing assembly 206 can include removably disposing a thermally conductive ceiling above the first and second compartments 208, 210 and below the airspace 558.

The method 1500 can further include retrofitting interior regions of the school building 100 for use as at least respective portions of the first, second, third, fourth, and additional rentable units 202, 204, 212, 214, 215 (block 1504). Retrofitting a given one of these interior regions will now be described with the understanding that the described features can also apply, when suitable, to retrofitting some or all of the other interior regions. Retrofitting the given interior region can include retrofitting the given interior region for lodging use, residential use, office use, assembly use, and/or for one or more other suitable uses. In at least some cases, retrofitting the given interior region includes installing (e.g., permanently or removably disposing) a given one of the bathrooms 216 in operable association with the given interior region, such as within or adjacent to a given one of the classrooms 108, within or adjacent to the oversized room 114, within or adjacent to the hallway 106, or outside the school building 100. Furthermore, installing the given bathroom 216 can include at least substantially reversibly assembling a set of reusable bathroom modules to form a first assembly of reusable bathroom modules. For example, the floor module 300 can be disposed (e.g., removably disposed) at a suitable location within or outside the school building 100 and the wall modules 304 can be removably connected to the floor module 300 at a perimeter of the floor module 300.

The method 1500 can still further include installing (e.g., removably or permanently disposing) the plumbing drain lines 218 (block 1506) within and/or outside the school building 100 and installing (e.g., removably or permanently disposing) the cold and hot water supply lines 220, 222 within and/or outside the school building 100 (block 1508). For example, the method 1500 can include operably connecting the given bathroom 216 to the plumbing drain trunk line 142 via a given one of the plumbing drain lines 218. This can include operably connecting the given plumbing drain line 218 to the plumbing drain trunk line 142 via one or more of the toilet hookups 232. Similarly, the method 1500 can include operably connecting the given bathroom 216 to the water supply trunk line 144 via given ones of the cold and hot water supply lines 220, 222. This can include operably connecting the given cold and hot water supply lines 220, 222 to the water supply trunk line 144 via one or more of the sink hookups 233. The method 1500 can also include installing (e.g., removably or permanently disposing) the sewage detention tank 234 (block 1510) within or outside the school building 100 and installing (e.g., removably or permanently disposing) the cold and hot water reservoirs 236, 238 within or outside the school building 100 (block 1512). Furthermore, operably connecting the given bathroom 216 to the plumbing drain trunk line 142 can include operably connecting the given bathroom 216 to the plumbing drain trunk line 142 via the sewage detention tank 234, which can include operably connecting the sewage detention tank 234 to the plumbing drain trunk line 142 via one or more of the toilet hookups 232. Similarly, operably connecting the given bathroom 216 to the water supply trunk line 144 can include operably connecting the given cold and hot water supply lines 220, 222 to the water supply trunk line 144 via the cold and hot water reservoirs 236, 238, respectively, which can include operably connecting the cold and hot water reservoirs 236, 238 to the water supply trunk line 144 via one or more of the sink hookups 233.

The method 1500 can also include retrofitting (e.g., at least substantially reversibly retrofitting) a given one of the window openings 122 (block 1514), such as to provide direct access to the corresponding one of the classrooms 108 or to a corresponding one of the first and second compartments 208, 210. This can include removing (e.g., temporarily removing) a corresponding one of the sashes 124 from the given window opening 122. Furthermore, retrofitting the given window opening 122 can include installing (e.g., removably disposing) a given one of the doorways 702, a given one of the exterior stairways 704, and/or a given one of the interior stairways 706 in operable association with the given window opening 122. For example, installing the given doorway 702 can include removably inserting and/or overlaying the given doorway 702 into and/or onto the given window opening 122, respectively. Installing the given exterior stairway 704 can include at least substantially reversibly assembling a set of reusable exterior stairway modules to form an assembly of reusable exterior stairway modules. Similarly, installing the given interior stairway 706 can include at least substantially reversibly assembling a set of reusable interior stairway modules to form an assembly of reusable interior stairway modules. Installing the given exterior stairway 704 can further include permanently disposing a given one of the footings 708 outside the corresponding window opening 122 and removably connecting the given exterior stairway 704 to the given footing 708.

In at least some cases, retrofitting the interior regions is at least substantially reversible, and the method 1500 includes reversing some or all of the retrofits (block 1516). For example, the method 1500 can include at least partially reversing the retrofitting of the interior regions between 5 and 15 weeks after retrofitting the interior regions. Reversing the retrofitting can include removing the bathrooms 216 and furnishings from operable association with the corresponding interior regions. Reversing the retrofitting can further include removing the doorways 702, the exterior stairways 704, and the interior stairways 706 from operable association with the corresponding window openings 122. Reversing the retrofitting can still further include replacing the sashes 124 within the corresponding window openings 122, replacing the doors 126 within the corresponding doorway openings 120, replacing the toilets 136 within the school bathrooms 110, and replacing the school desks 128 and the school chairs 130 within the classrooms 108. Retrofitting the interior regions and at least partially reversing the retrofitting of the interior regions can occur between successive academic sessions of the school at the school building 100. For example, the method 1500 can include repeatedly retrofitting the interior regions for annually reoccurring temporary use as at least the portions of corresponding rentable units during annually reoccurring recesses (e.g., summer recesses) of the school at the school building 100.

FIG. 37 is a block diagram illustrating a method 1600 for operating a given collection of rentable units and associated structures in accordance with an embodiment of the present technology. It should be understood that the method 1600, when suitable, and/or portions of the method 1600, when suitable, can be practiced with respect to any of the collections 200, 550, 600, 700, 1000, 1100, 1200, 1300, 1400 described above with reference to FIGS. 3-35 as well as with respect to other collections in accordance with embodiments of the present technology. With reference to FIGS. 3-37 together, the method 1600 can include operating the first, second, third, fourth, and additional rentable units 202, 204, 212, 214, 215. Operating the rentable units can include providing lodging, rentable residential space, rentable office space, rentable assembly space, and/or other suitable types of rentable space at the first, second, third, fourth, and additional rentable units 202, 204, 212, 214, 215. The first, second, third, fourth, and additional rentable units 202, 204, 212, 214, 215 can be operated as the same usage type or as different usage types. Furthermore, the first, second, third, fourth, and additional rentable units 202, 204, 212, 214, 215 can be operated as more than one usage type simultaneously or nearly simultaneously (e.g., as rentable office space during the day and as lodging at night). The non-school uses can be provided in an annually reoccurring manner, such as for durations of between 5 and 15 weeks between successive academic sessions of the school at the school building 100.

Operating the rentable units can include providing renter access to suitable features of the first, second, third, fourth, and additional rentable units 202, 204, 212, 214, 215 described above. Operating the first rentable unit 202 will now be described with the understanding that the described features can also apply, when suitable, to operating the second, third, and fourth rentable units 204, 212, 214, and other rentable units of a given collection. Operating the first rentable unit 202 can include providing renter access to the classroom 108a (block 1602), such as via the hallway 106 and via the doorway opening 120 of the classroom 108a, and/or from the exterior of the school building 100 via one of the window openings 122 of the classroom 108a. Operating the first rentable unit 202 can further include providing renter access to the bathroom 216a (block 1604), such as via one of the window openings 122 of the classroom 108a or via the doorway opening 120 of the classroom 108a. In at least some embodiments, operating the first rentable unit 202 includes providing direct renter access to the classroom 108a from the exterior of the school building 100, such as via one of the window openings 122 of the classroom 108a, via the doorway 702a, via the exterior stairway 704a, and/or via the interior stairway 706a.

The method 1600 can further include flowing waste from the bathroom 216a toward the plumbing drain trunk line 142 via the plumbing drain line 218a (block 1606). This can occur at least partially within the hallway 106 (e.g., over a distance of at least two meters within the hallway 106) and/or at least partially outside the school building 100 (e.g., over a distance of at least two meters outside the school building 100). Furthermore, flowing waste from the bathroom 216a toward the plumbing drain trunk line 142 can include flowing the waste via one or more of the toilet hookups 232. Similarly, flowing waste from the bathroom 216a toward the plumbing drain trunk line 142 can include flowing the waste via the sewage detention tank 234. In these cases, flowing waste from the bathroom 216a toward the plumbing drain trunk line 142 can further include flowing waste from the sewage detention tank 234 toward the plumbing drain trunk line 142, such as via one or more of the toilet hookups 232.

The method 1600 can still further include flowing water from the water supply trunk line 144 toward the bathroom 216a via the cold and hot water supply lines 220a, 222a (block 1608). This can occur at least partially within the hallway 106 (e.g., over a distance of at least two meters within the hallway 106) and/or at least partially outside the school building 100 (e.g., over a distance of at least two meters outside the school building 100). Furthermore, flowing water from the water supply trunk line 144 toward the bathroom 216a can include flowing the water via one or more of the sink hookups 233 of the school bathroom 110a. Similarly, flowing water from the water supply trunk line 144 toward the bathroom 216a can include flowing the water via the cold and hot water reservoirs 236, 238. In these cases, flowing water from the water supply trunk line 144 toward the bathroom 216a can further include flowing water from the water supply trunk line 144 toward the cold and hot water reservoirs 236, 238, such as via one or more of the sink hookups 233 of the school bathroom 110a.

In at least some embodiments, the method 1600 includes operating the heating system 560 (block 1610) to heat the airspace 558 and thereby provide shared below-room-temperature baseline heating to the third and fourth rentable units 212, 214 via the thermally conductive ceiling of the compartmentalizing assembly 206, when present. Similarly, the method 1600 can include operating the heating system 560 to provide below-room-temperature baseline heating to the first and second rentable units 202, 204. Like the heating system 560, other permanent systems of the school building 100 (e.g., electrical systems and water heating systems) can be taken offline or remain online while the first, second, third, fourth, and additional rentable units 202, 204, 212, 214, 215 are operated to provide the non-school uses. Components of the given collection can modify the capacities or other attributes of these systems. Examples of capacity-modifying components include the hot water reservoir 238 and the supplemental heaters 562, among others.

This disclosure is not intended to be exhaustive or to limit the present technology to the precise forms disclosed herein. Although specific embodiments are disclosed herein for illustrative purposes, various equivalent modifications are possible without deviating from the present technology, as those of ordinary skill in the relevant art will recognize. In some cases, well-known structures and functions have not been shown or described in detail to avoid unnecessarily obscuring the description of the embodiments of the present technology. Although steps of methods may be presented herein in a particular order, in alternative embodiments the steps may have another suitable order. Similarly, certain aspects of the present technology disclosed in the context of particular embodiments can be combined or eliminated in other embodiments. Furthermore, while advantages associated with certain embodiments may have been disclosed in the context of those embodiments, other embodiments can also exhibit such advantages, and not all embodiments need necessarily exhibit such advantages or other advantages disclosed herein to fall within the scope of the present technology. This disclosure and the associated technology can encompass other embodiments not expressly shown or described herein.

The methods disclosed herein include and encompass, in addition to methods of practicing the present technology (e.g., methods of making and operating physical embodiments of the present technology), methods of instructing others to practice the present technology. For example, a method in accordance with a particular embodiment includes operating a first rentable unit encompassing at least a portion of a first retrofitted classroom within a retrofitted school building and operating a second rentable unit encompassing at least a portion of a second retrofitted classroom within the retrofitted school building. A method in accordance with another embodiment includes instructing such a method.

Throughout this disclosure, the singular terms "a," "an," and "the" include plural referents unless the context clearly indicates otherwise. Similarly, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Additionally, the terms "comprising," "including," and the like are used throughout this disclosure to mean including at least the recited feature(s) such that any greater number of the same feature(s) and/or one or more additional types of features are not precluded. Directional terms, such as "upper," "lower," "front," "back," "vertical," and "horizontal," may be used herein to express and clarify the relationship between various structures. It should be understood that such terms do not denote absolute orientation. Furthermore, reference herein to "one embodiment," "an embodiment," or similar phrases means that a particular feature, structure, operation, or characteristic described in connection with such phrases can be included in at least one embodiment of the present technology. Thus, such phrases as used herein are not necessarily all referring to the same embodiment. Finally, it should be noted that various particular features, structures, operations, and characteristics of the embodiments described herein may be combined in any suitable manner in additional embodiments in accordance with the present technology.

I claim:

1. A collection of rentable lodging or residential units and associated structures, the collection comprising:
a first rentable lodging or residential unit encompassing at least a portion of a first retrofitted classroom within a purpose-built school building retrofitted to accommodate the collection, wherein the first rentable lodging or residential unit includes—
a first reusable bathroom removably disposed in operable association with the first retrofitted classroom, wherein the first reusable bathroom includes a first toilet, and
first lodging or residential furnishings within the first retrofitted classroom, wherein the first lodging or residential furnishings include a first bed; and
a second rentable lodging or residential unit encompassing at least a portion of a second retrofitted classroom within the retrofitted school building, wherein the second rentable lodging or residential unit includes—
a second reusable bathroom removably disposed in operable association with the second retrofitted classroom, wherein the second reusable bathroom includes a second toilet, and
second lodging or residential furnishings within the second retrofitted classroom, wherein the second lodging or residential furnishings include a second bed;
a first above-floor plumbing drain line, wherein the retrofitted school building includes a below-floor plumbing drain trunk line, and wherein the first reusable bathroom is operably connected to the below-floor plumbing drain trunk line through the first above-floor plumbing drain line;
a second above-floor plumbing drain line through which the second reusable bathroom is operably connected to the below-floor plumbing drain trunk line; and
an above-floor sewage detention tank, wherein the first and second reusable bathrooms are operably connected to the below-floor plumbing drain trunk line via the above-floor sewage detention tank.

2. The collection of claim 1 wherein:
the retrofitted school building includes a hallway adjacent to the first and second retrofitted classrooms;
the first above-floor plumbing drain line extends over a length of at least two meters within the hallway; and
the second above-floor plumbing drain line extends over a length of at least two meters within the hallway.

3. The collection of claim 1 wherein:
the retrofitted school building includes a retrofitted school bathroom having a toilet hookup; and
the above-floor sewage detention tank is operably connected to the below-floor plumbing drain trunk line via the toilet hookup.

4. The collection of claim 1 wherein the retrofitted school building is at least substantially reversibly retrofitted to accommodate the collection.

5. The collection of claim 1 wherein:
the retrofitted school building includes—
a main entrance, and
a hallway operably connected to the main entrance and adjacent to the first and second retrofitted classrooms;
the first reusable bathroom blocks access to the first retrofitted classroom from the main entrance via the hallway; and
the second reusable bathroom blocks access to the second retrofitted classroom from the main entrance via the hallway.

6. The collection of claim 1 wherein:
the retrofitted school building includes a water supply trunk line; and
the collection further comprises—
a first above-floor water supply line through which the first reusable bathroom is operably connected to the water supply trunk line, and
a second above-floor water supply line through which the second reusable bathroom is operably connected to the water supply trunk line.

7. The collection of claim 6, further comprising an above-floor water reservoir, wherein the first and second reusable bathrooms are operably connected to the water supply trunk line via the above-floor water reservoir.

8. The collection of claim 1 wherein:
the retrofitted school building includes a retrofitted oversized room; and
the collection further comprises—
a compartmentalizing assembly including reusable wall components removably disposed within the retrofitted oversized room, the compartmentalizing assembly defining first and second compartments of the retrofitted oversized room,
a third rentable unit encompassing at least a portion of the first compartment, wherein the third rentable unit includes a third reusable bathroom removably disposed in operable association with the first compartment, and
a fourth rentable unit encompassing at least a portion of the second compartment, wherein the fourth rentable unit includes a fourth reusable bathroom removably disposed in operable association with the second compartment.

9. A collection of rentable lodging or residential units and associated structures, the collection comprising:
a first rentable lodging or residential unit encompassing at least a portion of a first retrofitted classroom within a purpose-built school building retrofitted to accommodate the collection, wherein the first retrofitted classroom includes a window opening retrofitted to provide direct access to the first retrofitted classroom from an exterior of the retrofitted school building, and wherein the first rentable lodging or residential unit includes—
a first reusable bathroom removably disposed in operable association with the first retrofitted classroom, and
first lodging or residential furnishings within the first retrofitted classroom, wherein the first lodging or residential furnishings include a first bed; and
a second rentable lodging or residential unit encompassing at least a portion of a second retrofitted classroom within the retrofitted school building, wherein the second retrofitted classroom includes a window opening retrofitted to provide direct access to the second retrofitted classroom from the exterior of the retrofitted school building, and wherein the second rentable lodging or residential unit includes—
a second reusable bathroom removably disposed in operable association with the second retrofitted classroom, and
second lodging or residential furnishings within the second retrofitted classroom, wherein the second lodging or residential furnishings include a second bed;
a first reusable doorway removably disposed in operable association with the window opening of the first retrofitted classroom; and
a second reusable doorway removably disposed in operable association with the window opening of the second retrofitted classroom.

10. The collection of claim 9 wherein:
the window opening of the first retrofitted classroom is at least substantially reversibly retrofitted to provide direct access to the first retrofitted classroom from the exterior of the retrofitted school building; and
the window opening of the second retrofitted classroom is at least substantially reversibly retrofitted to provide direct access to the second retrofitted classroom from the exterior of the retrofitted school building.

11. The collection of claim 9 wherein:
the window opening of the first retrofitted classroom has a removed sash; and
the window opening of the second retrofitted classroom has a removed sash.

12. The collection of claim 9 wherein:
the retrofitted school building includes a below-floor plumbing drain trunk line; and
the collection further comprises—
a first above-floor plumbing drain line through which the first reusable bathroom is operably connected to the below-floor plumbing drain trunk line, and
a second above-floor plumbing drain line through which the second reusable bathroom is operably connected to the below-floor plumbing drain trunk line.

13. The collection of claim 9 wherein:
the retrofitted school building includes—
a main entrance, and
a hallway operably connected to the main entrance and adjacent to the first and second retrofitted classrooms;
the first reusable bathroom blocks access to the first retrofitted classroom from the main entrance via the hallway; and
the second reusable bathroom blocks access to the second retrofitted classroom from the main entrance via the hallway.

14. The collection of claim 9 wherein:
the first reusable doorway is a first reusable doorway insert; and
the second reusable doorway is a second reusable doorway insert.

15. The collection of claim 9 wherein:
the first reusable doorway is a first reusable doorway overlay; and
the second reusable doorway is a second reusable doorway overlay.

16. The collection of claim 9 wherein:
the retrofitted school building includes a retrofitted oversized room; and
the collection further comprises—
a compartmentalizing assembly including reusable wall components removably disposed within the retrofitted oversized room, the compartmentalizing assembly defining first and second compartments of the retrofitted oversized room,
a third rentable unit encompassing at least a portion of the first compartment, wherein the third rentable unit includes a third reusable bathroom removably disposed in operable association with the first compartment, and
a fourth rentable unit encompassing at least a portion of the second compartment, wherein the fourth rentable unit includes a fourth reusable bathroom removably disposed in operable association with the second compartment.

17. The collection of claim 6 wherein the retrofitted oversized room is a retrofitted auditorium, gym, or cafeteria.

18. The collection of claim 6 wherein:
the retrofitted oversized room includes a finished floor; and
the reusable wall components are removably disposed over the finished floor.

19. A collection of rentable lodging or residential units and associated structures, the collection comprising:
a first rentable lodging or residential unit encompassing at least a portion of a first retrofitted classroom within a purpose-built school building retrofitted to accommodate the collection, wherein the first retrofitted classroom includes a window opening retrofitted to provide direct access to the first retrofitted classroom from an exterior of the retrofitted school building, and wherein the first rentable lodging or residential unit includes—
a first reusable bathroom removably disposed in operable association with the first retrofitted classroom, and
first lodging or residential furnishings within the first retrofitted classroom, wherein the first lodging or residential furnishings include a first bed; and
a second rentable lodging or residential unit encompassing at least a portion of a second retrofitted classroom within the retrofitted school building, wherein the second retrofitted classroom includes a window opening retrofitted to provide direct access to the second retrofitted classroom from the exterior of the retrofitted school building, and wherein the second rentable lodging or residential unit includes—
- a second reusable bathroom removably disposed in operable association with the second retrofitted classroom, and second lodging or residential furnishings within the second retrofitted classroom, wherein the second lodging or residential furnishings include a second bed;
- a first reusable exterior stairway or ramp removably disposed in operable association with the window opening of the first retrofitted classroom; and
- a second reusable exterior stairway or ramp removably disposed in operable association with the window opening of the second retrofitted classroom.

20. The collection of claim 19, further comprising:
- a first reusable interior stairway or ramp removably disposed in operable association with the window opening of the first retrofitted classroom; and
- a second reusable interior stairway or ramp removably disposed in operable association with the window opening of the second retrofitted classroom.

\* \* \* \* \*